US006309114B1

(12) United States Patent
Torisawa et al.

(10) Patent No.: US 6,309,114 B1
(45) **Date of Patent: *Oct. 30, 2001**

(54) HEAT PROCESSING APPARATUS AND HEAT DEVELOPING APPARATUS USING THE SAME

(75) Inventors: Nobuyuki Torisawa; Masaharu Ogawa; Takeshi Nakamura, all of Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,332

(22) Filed: Aug. 25, 1998

(30) Foreign Application Priority Data

Aug. 26, 1997 (JP) .................................................. 9-229684
Jun. 24, 1998 (JP) .................................................. 10-177610

(51) Int. Cl.[7] .............................. G03B 13/00; F27B 9/06
(52) U.S. Cl. ............................ 396/575; 355/27; 219/216
(58) Field of Search .............................. 396/575; 355/27; 219/216, 388; 430/350, 353

(56) References Cited

U.S. PATENT DOCUMENTS

| | | | | |
|---|---|---|---|---|
| 1,999,965 | * | 4/1935 | Hall | 396/579 |
| 3,449,547 | * | 6/1969 | Goodman et al. | 219/216 |
| 3,621,201 | | 11/1971 | Crane . | |
| 3,864,709 | * | 2/1975 | Bruns | 396/575 |
| 4,118,179 | * | 10/1978 | Ballinger | 219/216 |
| 4,275,959 | * | 6/1981 | Jones | 355/27 |
| 4,653,890 | * | 3/1987 | Nordstrom et al. | 396/575 |
| 5,774,204 | * | 6/1998 | Suzuki et al. | 355/27 |
| 5,802,421 | * | 9/1998 | Miura | 219/216 |
| 5,893,003 | * | 4/1999 | Allen | 396/575 |
| 5,990,461 | * | 11/1999 | Stumpf et al. | 219/216 |
| 6,007,971 | * | 12/1999 | Star et al. | 430/350 |

FOREIGN PATENT DOCUMENTS

| | | |
|---|---|---|
| 63-313157 | 12/1988 | (JP) . |
| 04-368946 | 12/1992 | (JP) . |
| 06-332143 | 12/1994 | (JP) . |
| 95-30934 | 11/1995 | (WO) . |

* cited by examiner

*Primary Examiner*—Alan A. Mathews
(74) *Attorney, Agent, or Firm*—Sughrue, Mion, Zinn, Macpeak & Seas, PLLC

(57) ABSTRACT

A heat processing apparatus is disclosed, comprising a heater to perform heat processing of prescribed temperature to a sheet to be heat processed at a fixed position, a transferring means to convey the sheet to be heat processed by sliding on the surface of the heater, and a pressing means to press at least one part of the sheet to be heat processed against the surface of the heater during transferring.

44 Claims, 15 Drawing Sheets

HEAT PROCESSING APPARATUS AND HEAT DEVELOPING APPARATUS USING THE SAME

FIELD OF THE INVENTION

The present invention relates to a heat processing apparatus to perform heat processing to a sheet to be heat processed and also relates to a heat developing apparatus using such a heat processing apparatus which is applied for recording in a dry system such as image recording in which a wet processing is not carried out and a dry system material is used.

BACKGROUND OF THE INVENTION

In an image recording apparatus for recording a medical image using a heat storage fluorescent sheet, e.g., a digital radiographic system, CT, MR, etc., a wet system in which an image is photographed or recorded on a silver salt photographic light-sensitive material, and then wet processed to obtain a reproduced image has been used.

However, in recent years, a recording apparatus by a dry system in which wet processing is not necessary to be carried out has attracted public attention. In such a recording apparatus, a light-sensitive and/or a heat-sensitive recording material (a light-sensitive heat-sensitive recording material) and a heat-developable light-sensitive film (hereinafter referred to as "a recording material") are used. In this recording apparatus by a dry system, a latent image is formed by irradiation of a laser beam (scanning) on a recording material at an exposing part, then the recording material is heat developed by contacting with a heating means such as a heating drum at a heat developing part, thereafter the recording material on which an image has been formed is discharged from the recording apparatus.

By such a dry system, not only image formation can be effected within a short period of time as compared with wet processing but also a problem of the disposal of a waste solution in wet processing can be resolved, therefore, the increase of demand for such a system in the future is predictable enough.

In the above dry system, in general, a heating drum is used as a heating means, an endless belt is wound around the heating drum at a fixed angle, and heat development is carried out at a heat developing part with conveying the recording material holding between the heating drum and the endless belt. However, when the tensile force of the endless belt becomes uneven due to heat deterioration and the like, the recording material and the heating drum do not come into contact evenly, as a result, uneven development is generated.

In particular, as medical images are required to be high quality, recording materials are higher sensitive and even a slight unevenness of the contact state of the recording material with the heating drum largely deteriorates the image quality.

Further, in the heating means, the temperature lowering at the peripheral part where heat supply is low and the generation of folds and wrinkles by buckling at the end part of the heating means when a recording material is put between the heating drum and the endless belt become problems.

Further, as disclosed in Japanese Patent Application No. 9-229684, in the case of the first recording material (the dry silver light-sensitive material) described therein, there are anxieties of heat conduction failure between the recording material and the heater and contamination of the recording material, contamination of apparatus members, e.g., rollers, and corrosion of electronic parts due to the volatile material from the first recording material.

SUMMARY OF THE INVENTION

The present invention has been done in view of the above problems.

An object of the present invention is to provide a heat processing apparatus which can form an image of high image quality without uneven development by realizing more even contact of a heater and a recording material without causing dust adhesion, without generating folds and wrinkles, without making scratches, and without corrosion of electronic parts.

The above object of the present invention is achieved by the following constitution of the present invention.

(1) A heat processing apparatus comprising a heater to perform heat processing of prescribed temperature to a sheet to be heat processed at a fixed position, a transfer-ring means to convey the sheet to be heat processed by sliding on the surface of the heater, and a pressing means to press at least one part of the sheet to be heat processed against the surface of the heater during transferring.

The preferred embodiments for the above (1) are shown below.

(2) The heat processing apparatus as described in the above (1), wherein the nonfunctional surface of the sheet to be heat processed is contact with the surface of the heater.

(3) The heat processing apparatus as described in the above (1), wherein the non-observing surface of the sheet to be heat processed is contact with the surface of the heater.

(4) The heat processing apparatus as described in the above (1), wherein the surface of the heater is covered with a lubricating sheet containing a fluororesin and having a low friction coefficient.

(5) The heat processing apparatus as described in the above (4), wherein the lubricating sheet comprises a resin material other than fluororesins, having a glass transition temperature higher than the heating temperature having being adhered on the fluororesin material.

(6) The heat processing apparatus as described in the above (4) or (5), wherein the heat processing apparatus is provided with a sheet-stretching means which imparts tensile strength to the lubricating sheet in the vertical direction to the transferring direction of the sheet to be heat processed.

(7) The heat processing apparatus as described in any one of the above (4) to (6), wherein the lubricating sheet can be freely released from the heater.

(8) The heat processing apparatus as described in any one of the above (4) to (7), wherein the lubricating sheet is electrically conductive.

(9) The heat processing apparatus as described in the above (1), wherein the surface of the heater is provided with a coating layer containing a fluororesin and having a low friction coefficient.

(10) The heat processing apparatus as described in the above (9), wherein the coating layer has surface hardness HV (0.025) of 300 or more.

(11) The heat processing apparatus as described in the above (9) or (10), wherein the coating layer has surface roughness Ra of 1.0 $\mu$m or less.

(12) The heat processing apparatus as described in any one of the above (9) to (11), wherein the surface roughness values of the coating layer and the sheet to be heat processed are in the range not overlapped with each other.

(13) The heat processing apparatus as described in the above (1), wherein the pressing means comprises a plurality of pressing rollers provided on the surface of the heater.

(14) The heat processing apparatus as described in the above (13), wherein the rotating accuracy of the pressing rollers is ½ of the thickness of the sheet to be heat processed.

(15) The heat processing apparatus as described in the above (13) or (14), wherein the most upstream pressing roller and the most downstream pressing roller of the pressing rollers are respectively arranged at positions within 5 mm from the extreme ends of the heater.

(16) The heat processing apparatus as described in the above (13), wherein the transferring means is arranged at least at the upstream position just in front of the pressing rollers among the upstream position just in front of and the downstream position just in the rear of the arrangement extent of the pressing rollers.

(17) The heat processing apparatus as described in the above (13), wherein the transferring means is a transfer-ring belt which is strained over driving rollers and shifts between the heater and the pressing rollers to convey the sheet to be heat processed.

(18) The heat processing apparatus as described in the above (17), wherein the transferring means is provided with rollers to estranging the transferring belt from the sheet to be heat processed between respective contiguous pressing rollers.

(19) The heat processing apparatus as described in the above (17), wherein the transferring belt which is a transferring means has a friction coefficient with the sheet to be heat processed higher than the friction coefficient of the surface of the heater with the sheet to be heat processed.

(20) The heat processing apparatus as described in the above (13), wherein the pressing rollers become a transferring means having driving force.

(21) The heat processing apparatus as described in the above (20), wherein the surfaces of the pressing rollers which function as pressing and transferring means have a friction coefficient with the sheet to be heat processed higher than the friction coefficient of the surface of the heater with the sheet to be heat processed.

(22) The heat processing apparatus as described in any one of the above (13) to (21), wherein each pressing roller comprises spit-shaped rollers having at least one cylindrical cutout in the axial direction.

(23) The heat processing apparatus as described in any one of the above (13) to (21), wherein the heater is a flat plate heater and the above-described plurality of pressing rollers are arranged on the upside of the flat plate heater to press the sheet to be heat processed on the flat plate heater from the upper side.

(24) The heat processing apparatus as described in the above (23), wherein the flat plate heater has the constitution of prescribed distribution of heat capacity.

(25) The heat processing apparatus as described in the above (23), wherein the thickness of the flat plate heater corresponds to the prescribed distribution of the heat capacity.

(26) The heat processing apparatus as described in the above (23), wherein the flat plate heater has the constitution of prescribed distribution of the electric power density.

(27) The heat processing apparatus as described in the above (23), wherein a plurality of dimples are provided on the surface of the flat plate heater on which the sheet to be heat processed is conveyed.

(28) The heat processing apparatus as described in any one of the above (13) to (21), wherein the heater is a curved plate heater curved in the transferring direction and the above-described plurality of pressing rollers are arranged along by this curved shape.

(29) The heat processing apparatus as described in the above (28), wherein the curved plate heater has the constitution of prescribed distribution of heat capacity.

(30) The heat processing apparatus as described in the above (29), wherein the thickness of the curved plate heater corresponds to the prescribed distribution of the heat capacity.

(31) The heat processing apparatus as described in the above (28), wherein a plurality of dimples are provided on the surface of the curved plate heater on which the sheet to be heat processed is conveyed.

(32) The heat processing apparatus as described in the above (28), wherein the spaces between rollers of the surface of the curved plate heater on which the sheet to be heat processed is conveyed, which are non-pressure parts of the pressing rollers, are formed flatly.

(33) The heat processing apparatus as described in the above (28), wherein between rollers which are non- pressure parts of the pressing rollers the surface of the curved plate heater on which the sheet to be heat processed is conveyed is a smooth convexity protruding toward the roller-arranged side.

(34) The heat processing apparatus as described in the above (28), wherein the inlet of the sheet to be heat processed of the curved plate heater is arranged at the position where the sheet to be heat processed is accepted in a horizontal state.

(35) A heat developing apparatus which comprises contacting a heat-developable light-sensitive material or a light-sensitive heat-sensitive recording material in which a latent image has been formed with a heating means at heat developing part to thereby obtain a visible image, wherein the heating means is a plate heater, a plurality of pressing rollers are arranged with facing each other along one surface of the plate heater, and the heat-developable light-sensitive material or the light-sensitive heat-sensitive recording material is passed between the pressing rollers and the plate heater by a transferring means thereby heat development is effected.

(36) The heat developing apparatus as described in the above (35), wherein the transferring means is arranged at least at the upstream position just in front of the pressing rollers among the upstream position just in front of and the downstream position just in the rear of the arrangement extent of the pressing rollers.

(37) The heat developing apparatus as described in the above (35), wherein the pressing rollers become a transferring means having driving force.

(38) The heat developing apparatus as described in the above (35), wherein the non-image-forming layer of the heat-developable light-sensitive material or the light-sensitive heat-sensitive recording material is in contact with the surface of the plate heater.

(39) The heat developing apparatus as described in any one of the above (35) to (38), wherein the plate heater is a flat plate heater.

(40) The heat developing apparatus as described in any one of the above (35) to (38), wherein the plate heater is a curved plate heater.

(41) The heat developing apparatus as described in any one of the above (35) to (40), wherein the surface of the plate heater is covered with a lubricating sheet containing a fluororesin and having a low friction coefficient.

(42) The heat developing apparatus as described in any one of the above (35) to (40), wherein the surface of the plate heater is provided with a coating layer containing a fluororesin and having a low friction coefficient.

(43) The heat developing apparatus as described in the above (40), wherein one driving roller is arranged in contact with the plurality of pressing rollers with making the enveloping surface of the plurality of pressing rollers the circumferential surface and the plurality of pressing rollers are rotated by the driving roller.

(44) The heat developing apparatus as described in any one of the above (35) to (43), wherein the plurality of pressing rollers are arranged with varying the pitch between each roller.

(45) The heat developing apparatus as described in any one of the above (35) to (44), wherein the heat developing apparatus is provided with a gas filter to clean the ambient atmosphere of the plate heater.

According to the heat processing apparatus having the above constitution and the heat developing apparatus using such a heat processing apparatus, uneven development due to heat deterioration does not occur and a high image quality without uneven development can be obtained by the realization of uniform heating.

BRIEF DESCRIPTION OF THE DRAWINGS

FIG. 15(*b*) is a perspective drawing of 15(*a*).

DETAILED DESCRIPTION OF THE INVENTION

The present invention will be described in detail below with reference to the accompanying drawings.

Figure 1:
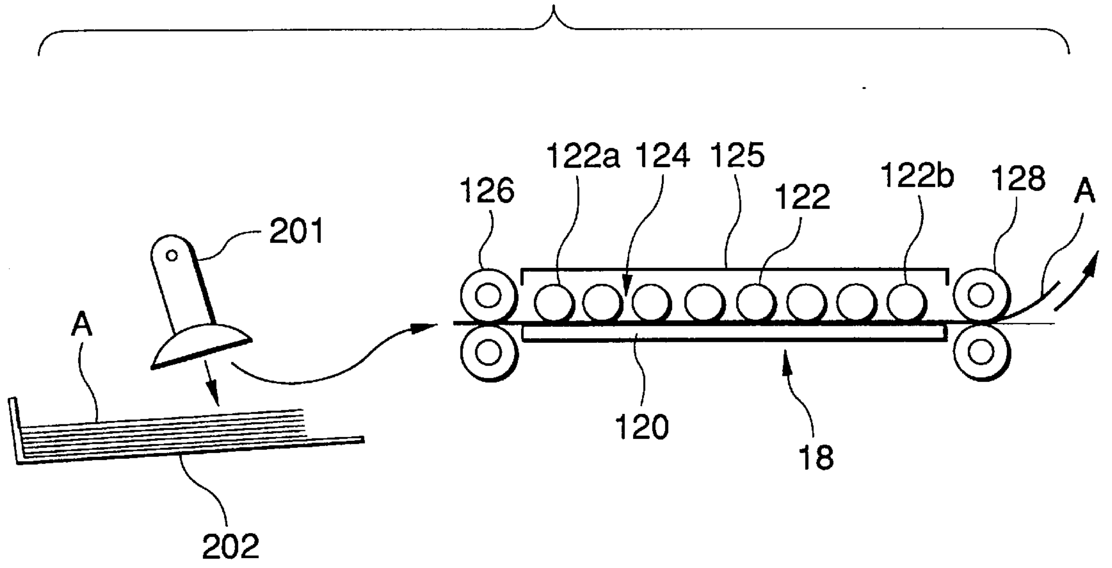
FIG. 1 is a schematic constitution drawing of a heat processing apparatus according to the first embodiment of the present invention.

FIG. 1 is a schematic constitution drawing of a heat processing apparatus according to the first embodiment of the present invention.

A heat processing apparatus according to the first embodiment of the present invention is an apparatus to heat sheet A of the type to which heat processing is applied, which comprises plate heater 120 which is heated to a temperature necessary to process sheet A, transferring means (i.e., feeding rollers) 126 to convey (slide) sheet A relatively to plate heater 120 while making sheet A in contact with the surface of plate heater 120, and pressing rollers 122 which are means to press the back surface of contact face of sheet A with plate heater 120 for the purpose of heat conduction from plate heater 120 to sheet A.

Plate heater 120 in this embodiment is a flat plate heater. Plate heater 120 is a plate-like heating member encasing a heating unit such as nichrome wire laid in a planar state, which is maintained at developing temperature of sheet A. Further, the material of the surface of plate heater 120 which is in contact with sheet A may be merely a heat conductive material and a rubber heater may be attached to the back surface thereof or the constitution may be such that heating is effected using hot air or a lamp.

Sheet A is drawn by suction by sucking unit 201 from accumulation tray 202 and guided to heat processing apparatus 18 through pair rollers (i.e., feeding rollers) 126 driven by a driving unit (not shown in the figure). Sheet A passes (slides) between pressing rollers 122 and plate heater 120 by driving transference due to pair rollers 126 and heat processing is performed. Sheet A heat processed is discharged via guide rollers 128.

For the purpose of avoiding scratches and the like as far as possible, the surface of sheet A which is in contact with plate heater 120 is preferably not the surface having the recording material layer. Further, in the case of a sheet in which observation is regarded as particularly important, it is preferred to avoid the contact of the surface of observation side with plate heater 120.

The number of pressing rollers 122 may be one but preferably two or more. Pressing rollers 122 are arranged with a prescribed pitch being in contact with one surface of plate heater 120 or with the distance smaller than the thickness of sheet A along the entire length of the transferring direction of plate heater 120, and these pressing rollers 122 and plate heater 120 constitute path 124 of sheet A (between plate heater 120 and pressing rollers 122. Making distance of sheet path 124 smaller than the thickness of sheet A ensures smooth insertion of sheet A and can prevent sheet A from buckling. Feeding rollers 126 and discharging rollers (i.e., guide rollers) 128 which are transferring means of sheet A are arranged at both ends of sheet path 124.

Any of metal rollers, resin rollers or rubber rollers may be used as pressing rollers 122. The heat conductivity of pressing rollers 122 is preferably from 0.1 to 200 w/m/° C.

Further, it is preferred that heat insulating cover 125 for heat insulation is provided on the surface side of pressing rollers 122 opposite to plate heater 120.

When sheet A is conveyed, if the tip of sheet A strikes against pressing roller 122, sheet A stops a moment. At that time, if pressing rollers 122 are arranged with the same pitch, the same part of sheet A stops at every pressing roller 122 and that part of sheet A is pressed against plate heater 120 for longer time, which sometimes results in generation of streakily uneven development stretching in the width direction. Therefore, it is preferred to make pitch of each pressing roller 122 uneven.

As a transferring means of sheet A, pair rollers 126 arranged near the upstream pressing roller 122 just in front of plate heater 120 are used. As such a transferring means, guide rollers 128 may have driving force.

Figure 2:
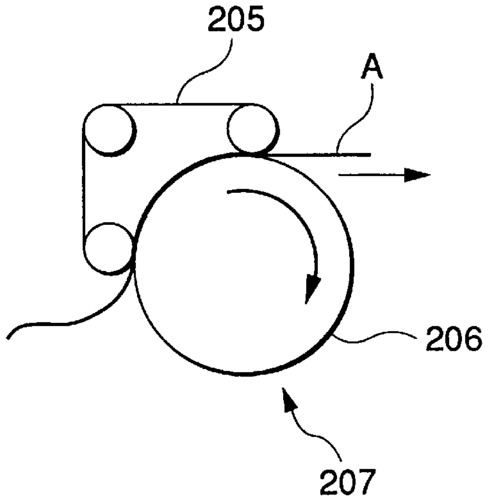
FIG. 2 is a schematic drawing showing a sheet transferring means according to another mode of the present invention.

Further, as another transferring means of sheet A, unit 207 comprising belt 205 and drum 206 conveying sheet A with holding sheet A between them is shown in FIG. 2. This drum transferring unit 207 is arranged at the position of pair rollers 126 to guide and pass sheet A between pressing rollers 122 and plate heater 120.

Figure 3:
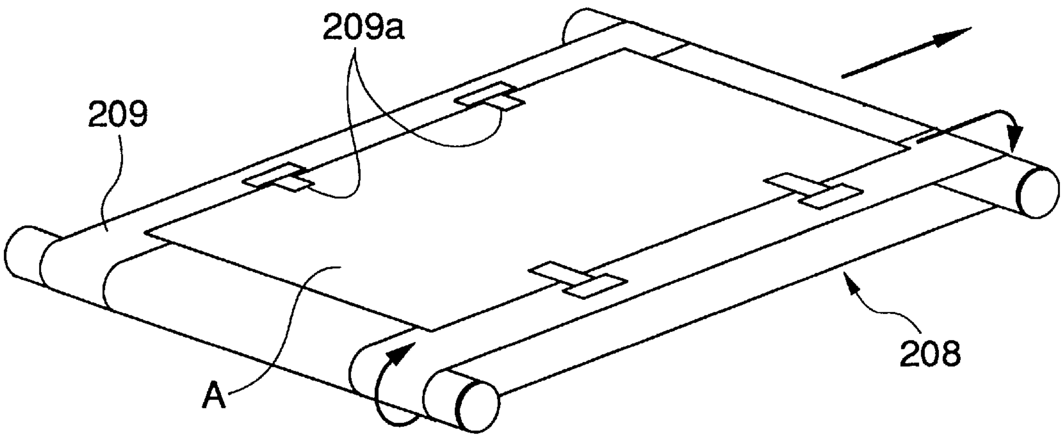
FIG. 3 is a schematic drawing showing a sheet transferring means according to still other mode of the present invention.

Further, as still other transferring means of sheet A, holding claw transferring unit 208 is shown in FIG. 3, which comprises holding claw 209*a* arranged on belt 209 which is rotationally driving to hold both ends of sheet A. This holding claw transferring unit 208 is arranged at the same position as the above drum transferring unit 207 to heat process sheet A. A transferring unit is not limited to these as far as the unit can guide and convey sheet A to a heat processing apparatus.

Figure 7:
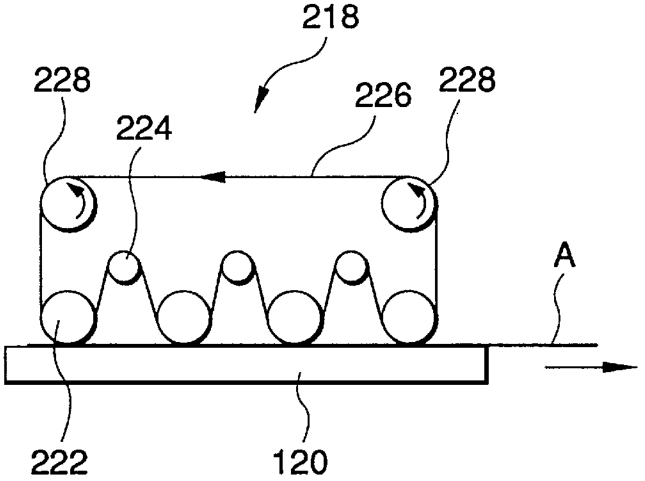
FIG. 7 is a schematic drawing of a principal part showing one mode of a sheet transferring means according to the present invention.

As one mode of transferring means to convey sheet A in the heat processing apparatus, transferring unit 218 is shown in FIG. 7, which comprises transferring belt 226 which is strained over driving rollers 228, then over pressing roller 222 and further strained over estranging roller 224. Sheet A is inserted between plate heater 120 and transferring belt 226 at the position of pressing roller 222 and conveyed by driving force of transferring belt 226. At this time, transference of sheet A is ensured by giving the friction coefficient with sheet A of transferring belt 226 higher than the friction coefficient of the surface of plate heater 120 with sheet A. In this constitution, feeding roller pair 126 and discharging roller pair 128 are arranged similarly to heat processing apparatus 18 shown in FIG. 1. Estranging roller 224 can prevent pressure distribution unevenness of sheet A which results from the state that transferring belt 226 is in contact with the whole surface of sheet A, thus heating unevenness can be avoided.

Figure 4:
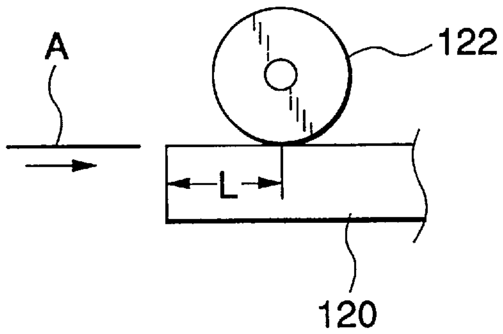
FIG. 4 is a schematic drawing of a principal part showing the pressing roller arrangement of a heat processing apparatus according to the present invention.
Figure 5:
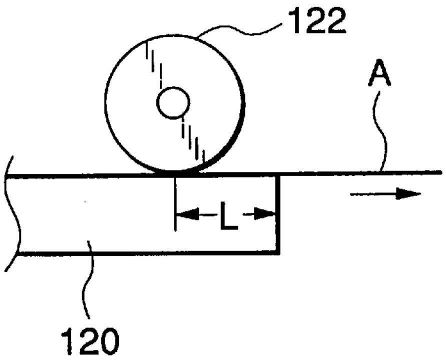
FIG. 5 is a schematic drawing of a principal part showing another pressing roller arrangement of a heat processing apparatus according to the present invention.

Heat processing apparatus 18 shown in FIG. 1 is described again. Of a plurality of pressing rollers 122, as to the positional relationship between the most upstream pressing roller 122*a*, the most downstream pressing roller 122*b* and plate heater 120, it is necessary that roller pressure between pressing rollers 122 and plate heater 120 should ensured and smooth insertion of sheet A should be realized so as to prevent sheet buckling. Accordingly, pressing rollers 122*a* and 122*b* are arranged near to respective corresponding ends of plate heater 120, preferably, as shown in FIGS. 4 and 5, pressing rollers 122*a* and 122*b* are arranged so that the distance L between the extreme ends of plate heater 120 and pressing rollers 122*a*, 122*b* falls within the range of $0<L<5$ mm.

Figure 6:
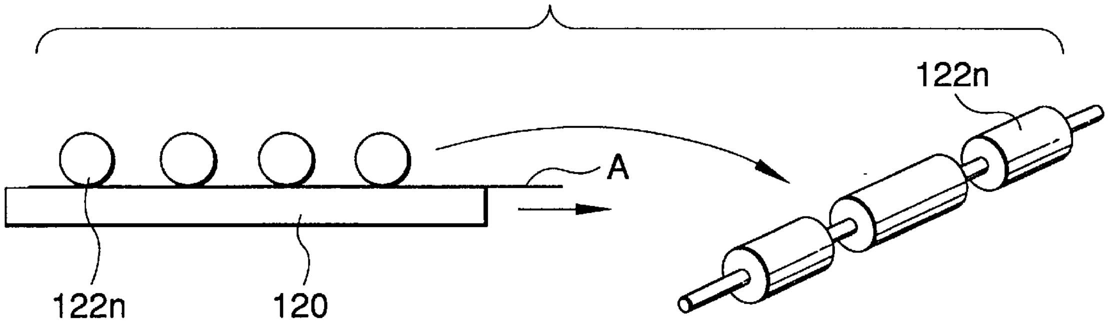
FIG. 6 is a schematic drawing of a principal part showing another mode of the pressing roller arrangement of a heat processing apparatus according to the present invention.

The shape of pressing rollers 122 is preferably cylindrical but it may be spit type pressing rollers 122*n* in which cylindrical parts are thrust in the axial direction as shown in FIG. 6.

In heat processing apparatus 18 shown in FIG. 1, pressing rollers 122 are merely means to press the back surface of the contact surface of sheet A with plate heater 120. Pressing rollers 122 may be given the constitution as a transferring means of sheet A besides the means of pressing sheet A.

Such constitution is, for example, connection of rotary driving unit (not shown) to each pressing roller 122 in heat processing apparatus 18. As a driving method thereat, each pressing roller 122 is provided with sprockets, etc., and gear driving, chain driving, belt driving, etc., can be used as driving means. Further, the constitution may be such that only one pressing roller 122 is driven. On the contrary, it is possible to take such constitution as all pressing rollers 122 may be driven by one driving source in view of the cost and space of the apparatus. When transfer-ring function is given to such pressing rollers 122 in addition to pressing function, it is preferred that the surfaces of pressing rollers 122 have a friction coefficient with sheet A higher than the friction coefficient of the surface of plate heater 120 with sheet A.

For pressing sheet A securely, it is preferred that the rotating accuracy (deflection) of pressing rollers 122 should not exceed ½ of the thickness of sheet A. Further, from the same reason, the pressure of pressing rollers 122 is preferably from 0.1 to 20 kg/m.

Figure 8:
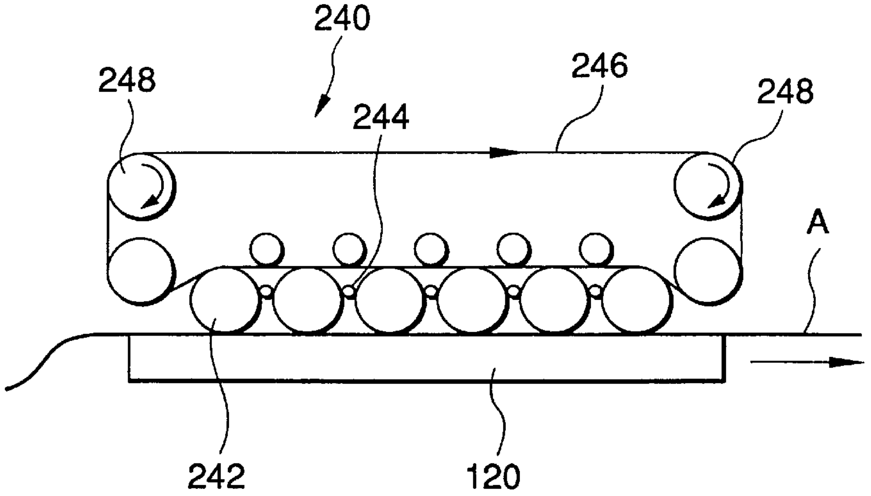
FIG. 8 is a schematic drawing of a principal part showing a belt driving unit for pressing rollers of a heat processing apparatus according to the present invention.

In FIG. 8, a heat processing apparatus adopting belt driving unit 240 for pressing rollers 242 is shown. The constitution of this heat processing apparatus is such that pressing rollers 242 are provided on plate heater 120 by pressing driving belt 246 strained over driving rollers 248 against pressing rollers 242. Further, bearing 244 is provided between each pressing roller 242 to prevent each pressing roller 242 from being in contact with each other and the conveying force of sheet A corresponding to the movement of driving belt 246 is given to pressing rollers 242.

In the above embodiment, flat plate heater 120 is used as a heater but diverse types of heaters are suitable to this heater as far as they can effectively supply heat to sheet A, for example, self exothermic heaters, e.g., ceramic heaters, heaters adhered with a heat conductive member, e.g., rubber heaters, those indirectly heating a heat conductive member by convection heat conduction from heated air, and those heating a heat conductive member by radiation using a halogen lamp heater can be used as a heater.

Exothermic distribution of plate heater 120 as a heater is preferably such that temperature gradient is provided so as to make the temperature of both ends of plate heater 120 higher than the temperature of other parts for compensating for the temperature reduction due to heat dissipation at both ends. High heat conductive materials such as metals having high heat conductivity are preferably used as a heat conductive member for improving heat conduction to sheet A. The heat conductivity of heat conductive members practically used is preferably from 1 to 400 w/m/° C., more preferably from 10 to 400 w/m/° C.

For preventing temperature reduction of a heater when heat processing of sheet A is conducted frequently, the heat supply amount of the heater should be large. In view of processing ability of about 150 sheets to be heat processed of a half-cut size (35.6×43.2 cm) for 60 minutes, the heat supply amount is preferably from 1 to 20 kw/m$^2$, more preferably from 5 to 20 kw/m$^2$.

The heat capacity of the heater is preferably distributed in the transferring direction of sheet A taking the heat efficiency into consideration. Since, in general, the temperature of sheet A to be conveyed is naturally lower than the heating temperature, heat exchange with sheet A is larger at the inlet of sheet A of the heater. Accordingly, making heat capacity of the heater on the inlet side of sheet A larger is effective to inhibit the temperature fluctuation of the heater.

Figure 9:
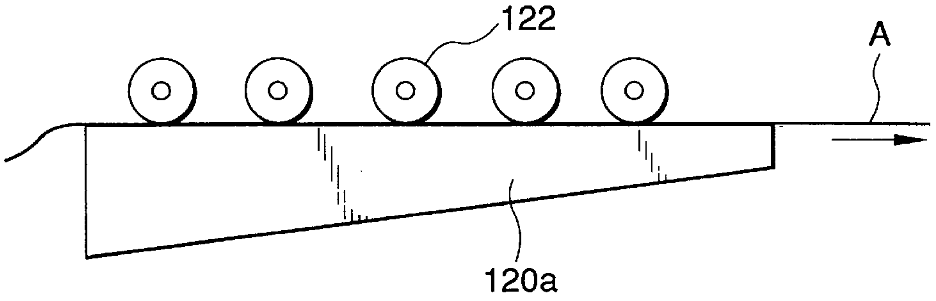
FIG. 9 is a schematic drawing of a principal part showing a heater of a heat processing apparatus according to another embodiment of the present invention.

The constitution of plate heater **120*a* which is another execution mode of a heater is shown in FIG. 9. Plate heater 120*a*** is fundamentally flat plate-like shape, and the thickness of the heater is gradually decreased from the inlet side of sheet A to the outlet to change the distribution of the heat capacity. The comparison with the heater having an even thickness is shown in Table 1 below.

Heat processing conditions in Table 1 were as follows:

A rubber heater was used, the electric power density was 5 kw/m$^2$ and uniform at every place.

The plate temperature was set up at 120° C., and when the temperature reached the prescribed temperature, 20 sheets of a half-cut size (35.6×43.2 cm) sheet A were continuously heat processed with the interval of 8 seconds.

TABLE 1

| | Comparative Example | Example |
|---|---|---|
| Plate thickness | Uniform thickness of 10 mm | Thickness gradient was provided in straight line, Inlet side: 12.5 mm Outlet side: 7.5 mm |
| Half-cut size, Temperature unevenness (in-plane) | ΔT = 3° C. | ΔT = 2° C. |
| Half-cut size, Temperature unevenness (face-to-face) | ΔT = 4° C. | ΔT = 3° C. |

As can be seen from the results in Table 1, the temperature fluctuation of the heater having thickness gradient is less and the quality of heat processing is improved.

Same as in the case of the heat capacity, the exothermic amount of plate heater 120 is also preferably distributed in the transferring direction of sheet A taking the heat efficiency into consideration. Since, in general, the temperature of sheet A to be conveyed is naturally lower than the heating temperature, heat exchange with sheet A is larger at the inlet of sheet A of the heater. Accordingly, making exothermic amount of the heater on the inlet side of sheet A larger is effective to inhibit the temperature fluctuation (e.g., temperature reduction) of the heater.

In flat plate heater 120, the electric power density of the rubber heater was gradually decreased from the inlet side of sheet A to the outlet to change the exothermic amount by changing wiring of resistance wires densely or sparsely in the transferring direction of sheet A. The comparison with the heater having even electric power density is shown in Table 2 below.

Heat processing conditions in Table 2 were as follows:

The thickness of the plate was uniformly 10 mm in the transferring direction of the sheet.

The plate temperature was set up at 120° C., and when the temperature reached the prescribed temperature, 20 sheets of a half-cut size (35.6×43.2 cm) sheet A were continuously heat processed with the interval of 8 seconds.

TABLE 2

| | Comparative Example | Example |
|---|---|---|
| Electric power density | Uniform density of 5 kw/m$^2$ | Gradient was provided in electric power density in straight line, Inlet side: 7.5 km/m$^2$ Outlet side: 2.5 km/m$^2$ |
| Half-cut size, Temperature unevenness (in-plane) | ΔT = 3° C. | ΔT = 1.5° C. |
| Half-cut size, Temperature unevenness (face-to-face) | ΔT = 4° C. | ΔT = 2.5° C. |

As can be seen from the results in Table 2, as compared with the plate heater having even electric power density, temperature fluctuation of plate heater 120 is less and the quality of heat processing is improved.

Figure 10:
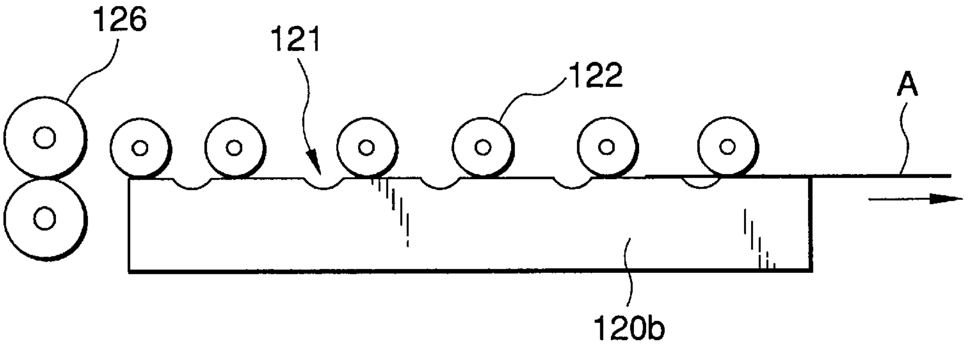
FIG. 10 is a schematic drawing of a principal part showing a heater of a heat processing apparatus according to still other embodiment of the present invention.

In the above-described heat processing apparatus 18, it often becomes a problem that sheet A is scratched by dusts get in between plate heater 120 and sheet A during transferring. The constitution of the plate heater to solve this problem is shown in FIG. 10, which comprises an adhesive roller, etc., arranged just in front of or just in the rear of feeding pair rollers 126 (not shown in the figure) to remove dusts and a plurality of dimples 121 formed on the surface of plate heater 120 which is in contact with sheet A. Dimples 121 can decrease the probability of dusts being pulled between plate heater 120 and sheet A.

Figure 11:
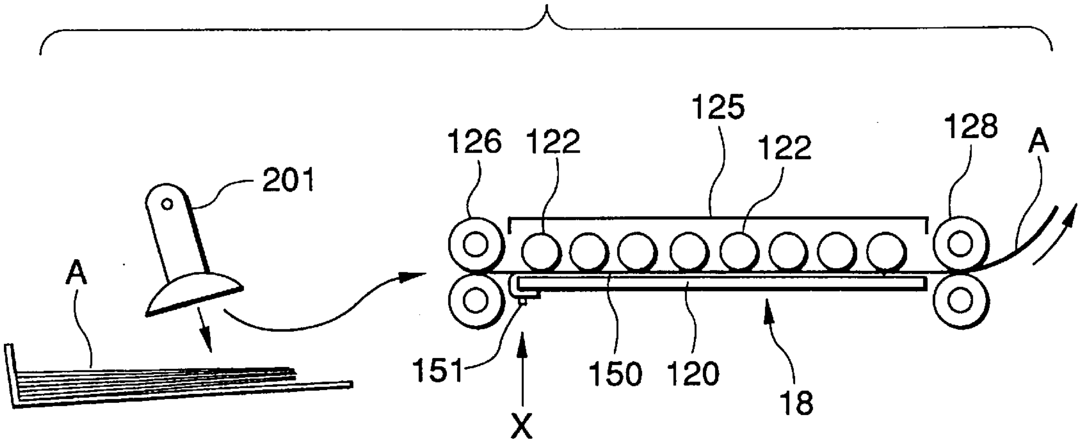
FIG. 11 is a schematic drawing showing a lubricating sheet between a plate heater and a sheet to be heat processed in a heat processing apparatus according to the present invention.

Heat processing apparatus 18 having the constitution to improve the sliding property between plate heater 120 and sheet A is shown in FIG. 11. In this constitution, the surface of plate heater 120 which is in contact with sheet A is covered with lubricating sheet 150 comprising a fluororesin. The element having the same function as the element in FIG. 1 is marked with the same symbol and description is omitted.

One end of lubricating sheet 150 is fixed on the surface side of plate heater 120 which is not in contact with sheet A, the other end is turned around the inlet side of sheet A to the side of plate heater 120 which is in contact with sheet A and is free end between pressing rollers 122 and plate heater 120 in the transferring direction of sheet A.

By using such lubricating sheet 150, sliding of sheet A becomes smooth, and sheet A can be conveyed satisfactorily, even if the pressure of pressing rollers 122 were small, and sheet A is not liable to make scratches as much.

With respect to this lubricating sheet 150, the friction coefficient with sheet A of the contact surface with sheet A is made low and a fluororesin is used so as not to scratch sheet A. However, a considerable thickness is necessary to satisfy the entire stiffness of the lubricating sheet only with a fluororesin, but if the thickness is enough, heat conduction from the heater to sheet A becomes insufficient, which is not preferred. As a means to cope with such a situation, the constitution of lubricating sheet 150 is made composite of a fluororesin and a resin material other than fluororesins having a glass transition temperature higher than the heating temperature having being adhered on the back surface of the fluororesin sheet.

As another mode of lubricating sheet 150, a sheet comprising glass cloth, carbon cloth or aramide cloth coated with a fluororesin can be used as a lubricating sheet.

Lubricating sheet 150 is preferably antistatic for preventing adhesion of dusts which cause scratches on sheet A during processing. Therefore, electric conductivity is preferably given to sheet A by including electrically conductive powders, e.g., carbon, or by conducting metal deposition on the sheet.

Lubricating sheet 150 can be freely released from plate heater 120 and can be exchanged when the sheet surface is abraded or contaminated.

Figure 12:
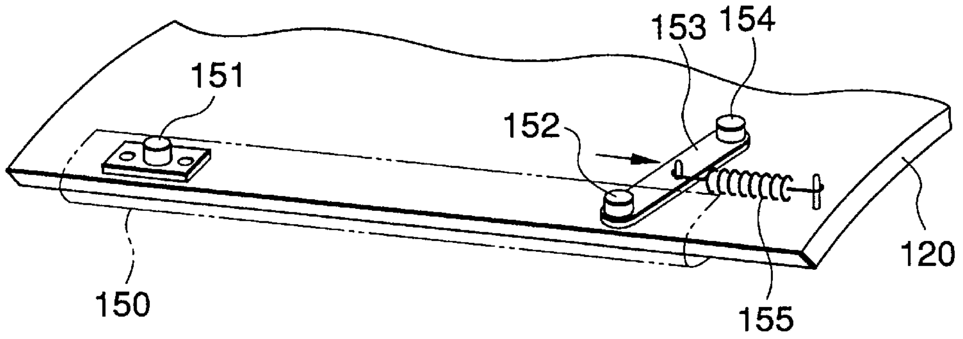
FIG. 12 is a perspective drawing of a principal part of the lubricating sheet shown in FIG. 11 viewed from the direction of arrow X.

FIG. 12 is a partially enlarged view of the part of plate heater 120 having lubricating sheet 150 installed, viewed from the direction of arrow X in FIG. 11. This constitution comprises a sheet tension structure for straining the sheet in the width direction of plate heater 120. Temperature rise and generation of wrinkles due to thermal expansion of lubricating sheet 150 when plate heater 120 is heated can be prevented by this constitution. Specifically illustrating, two holes have been previously bored through lubricating sheet 150. On the other hand, the non-transferring back surface of plate heater 120 is provided with pin 151 at the end of the width direction and supporting axis 154 is provided at the other end of the width direction of the non-transferring surface, which supports lever 153 provided with pin 152 oscillating freely. Lever 153 is provided with spring 155 having tensile force in the direction leaving pin 151. Two holes of lubricating sheet 150 are respectively hooked on pins 151 and 152 to thereby obtain tensile force in the width direction. According to this constitution, generation of wrinkles due to thermal expansion of lubricating sheet 150 can be prevented.

For conveying sheet A, the friction coefficient of sheet A with the surface of plate heater 120 is preferably smaller than that of sheet A with pressing rollers 122. Accordingly, in plate heater 120 the surface of which is composed of lubricating sheet 150 comprising a fluororesin, the friction coefficient K with sheet A of lubricating sheet 150 is preferably $0.05<K<0.7$.

Further, if sheet A and lubricating sheet 150 are both smooth, sheet A and lubricating sheet 150 adhere with each other and there is the possibility of sheet A not being able to be conveyed. Therefore, making the surface roughness values of the surface of lubricating sheet 150 and sheet A not overlap with each other can prevent the resistance increase due to vacuum adsorption resulting from overlapping of surface unevenness. Further, from the same reason, the contact ratio of the surface of sheet A and the surface of lubricating sheet 150 is preferably from 0 to 0.8.

Figure 13:
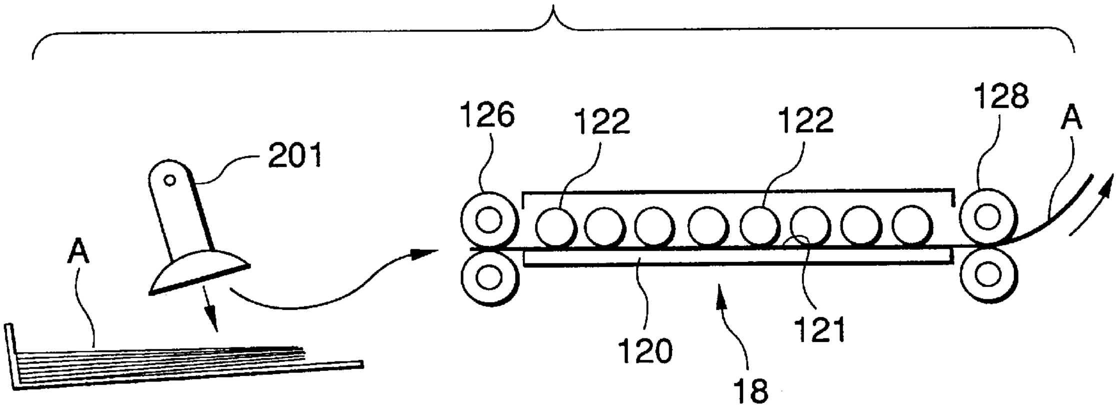
FIG. 13 is a schematic drawing showing the constitution to improve the sliding property between a plate heater and a sheet in a heat processing apparatus according to the present invention.

Heat processing apparatus 18 having still another constitution to improve the sliding property between plate heater 120 and sheet A is shown in FIG. 13.

In this constitution, the surface of plate heater 120 which is in contact with sheet A is coated with coating 121 having a low friction coefficient. The element having the same function as the element in FIG. 1 is marked with the same symbol and description is omitted.

By using coating 121, sliding of sheet A becomes smooth, and sheet A can be conveyed satisfactorily, even if the pressure of pressing rollers 122 were small, and sheet A is not liable to make scratches as much.

Coating 121 is a material which satisfies such conditions as it has a low friction coefficient with sheet A, it hardly scratches sheet A and the surface thereof is hardly abraded. The surface hardness of coating 121 is preferably high and the surface is preferably smooth. Applicable surface hardness of coating 121 is preferably HV (0.025) 300 or more, more preferably 400 or more, and most preferably 500 or more. Surface hardness Ra is preferably 1.0 $\mu$m or less, more preferably 0.6 $\mu$m or less, and most preferably 0.3 $\mu$m or less.

Specific examples of coating include electroplating, such as nickel plating, chromium plating, hard chromium plating, etc.; chemical plating,. Such as electroless nickel plating; electroless nickel plating plus fluororesin impregnation; anodic oxidation processing; anodic oxidation processing plus fluororesin impregnation; flame spray coating of ceramics, titanium oxide, etc.; flame spray coating of ceramics, titanium oxide plus fluororesin impregnation; and vacuum plating of DLC (diamond like carbon), titanium nitride, chromium nitride, chromium titanium nitride, titanium nitride carbide, etc.

For conveying sheet A, the friction coefficient of sheet A with the surface of plate heater 120 is preferably smaller than that of sheet A with pressing rollers 122. Accordingly, when the surface of plate heater 120 comprises coating, the friction coefficient K with sheet A of coating 121 is preferably $0.05<K<0.7$. Further, if sheet A and coating 121 of plate heater 120 are both smooth, there are possibilities such that sheet A and the surface of coating 121 adhere with each other and it is impossible to convey sheet A. Therefore, making the surface roughness values of the surface of coating 121 and sheet A not overlap with each other can prevent the resistance increase due to vacuum adsorption resulting from overlapping of surface unevenness. Further, from the same reason, the contact ratio of the surface of sheet A and the surface of coating 121 is preferably from 0 to 0.8.

Figure 14:
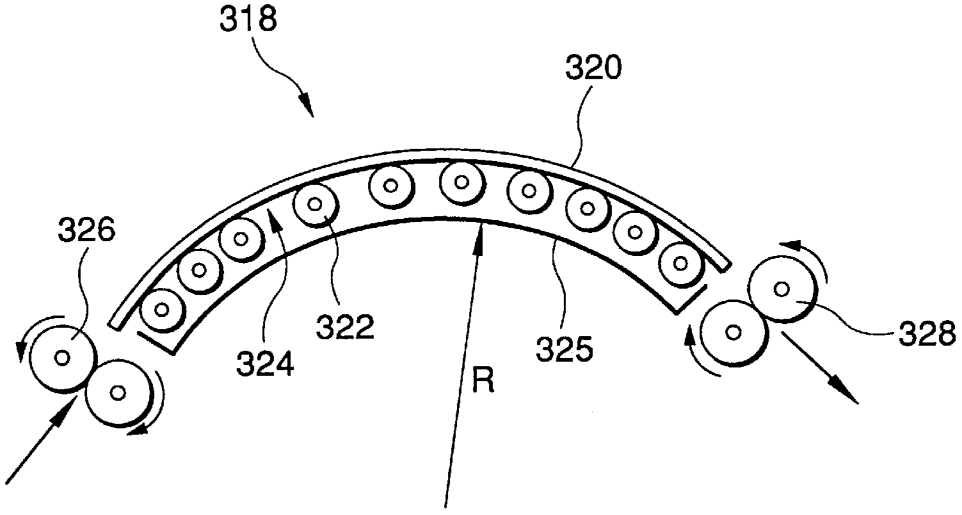
FIG. 14 is a schematic constitution drawing of a heat processing apparatus according to the second embodiment of the present invention.

FIG. 14 shows a heat processing apparatus according to the second embodiment of the present invention.

In the first embodiment, plate heater 120 is a flat plate-like shape and path 124 of a recording material is formed in a straight line but plate heater 320 in the second embodiment comprises a curved surface as shown in FIG. 14.

The constitution of heat processing apparatus 318 containing plate heater 320 comprises, as shown in FIG. 14, plate heater 320 which curves with the upside being convex, feeding rollers 326 as a transferring means to convey (slide) sheet A relatively to plate heater 320 while making sheet A in contact with the surface of plate heater 320, and pressing rollers 322 arranged on the lower side of plate heater 320 for the purpose of heat conduction from plate heater 320 to sheet A. By this constitution, as sheet A is conveyed with the tip of sheet A being pressed against plate heater 320, buckling of sheet A can be prevented.

Pressing rollers 322 and plate heater 320 constitute transferring path 324 of sheet A. Making distance of sheet transferring path 324 smaller than the thickness of sheet A ensures smooth insertion of sheet A and can prevent sheet A from buckling. Feeding pair rollers 326 for conveying sheet A and discharging pair rollers 328 are arranged at both ends of sheet transferring path 324.

Further, it is preferred that heat insulating cover 325 for heat insulation is installed on the surface side of pressing rollers 322 opposite to plate heater 320.

Driving of pressing rollers 322 is carried out, graphic display of which is omitted from the figure, according to the method comprising providing sprockets on the axle of each roller, wrapping a chain around the sprockets and actuating the chain.

Figures 15A, 15B:
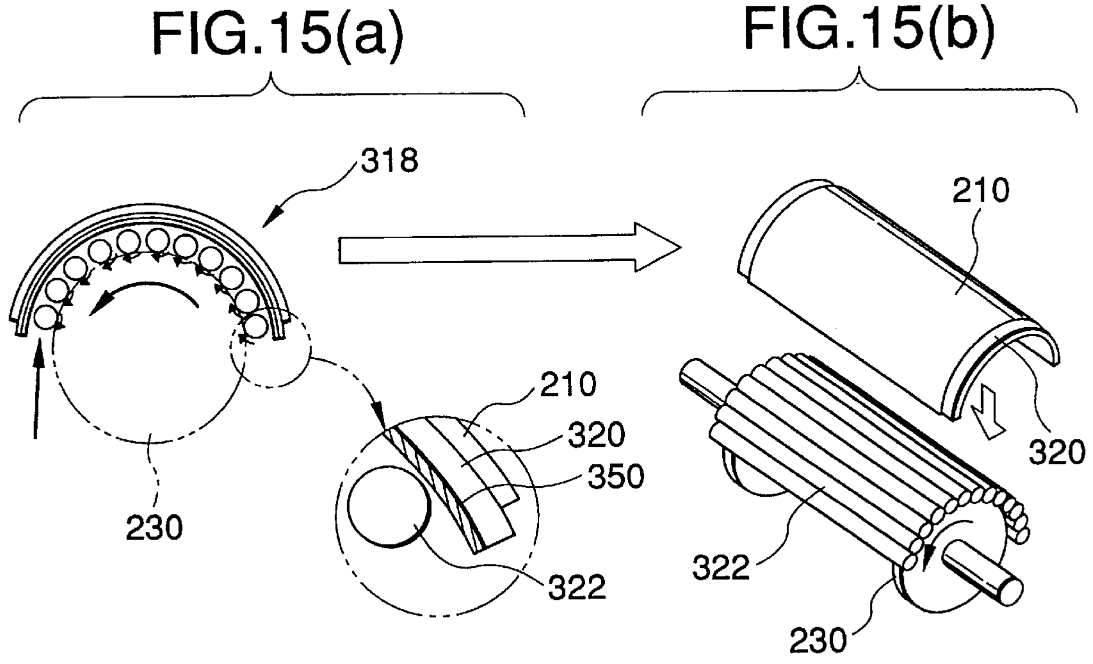
FIG. 15(*a*) is a schematic drawing of a principal part showing one embodiment of pressing roller driving of the heat processing apparatus shown in FIG. 14.

As shown in FIG. 15(*a*), the constitution may also be such that driving roller 230 is arranged in contact with each pressing roller 322 with making the enveloping surface of each pressing roller 322 the circumferential surface and each pressing roller 322 is rotated by the rotation of driving roller 230. Plate heater 320 is provided with lubricating sheet 350 similar to one shown in FIG. 11 on the pressing roller 322 side surface. When plate heater 320 is merely a heat conductor, heating unit 210 can be provided on the surface side of plate heater 320 opposite to pressing roller 322. As shown in the perspective drawing of the heat processing apparatus in FIG. 15(*b*), plate heater 320 is arranged so as to cover driving roller 230 and each pressing roller 322.

In the above explanation, plate heater 320 may be a heater or may comprise a plate member comprising a heat conductor and a heat source arranged on the side of the plate member opposite to the heating side of sheet A.

Sheet A is drawn by suction by an appropriate aspirating unit (not shown) from an accumulation tray and guided to heat processing apparatus 318 through feeding rollers 326. Sheet A passes between pressing rollers 322 and plate heater 320 and heat processing is performed. Sheet A heat processed is discharged via guide rollers 328.

Figure 16:
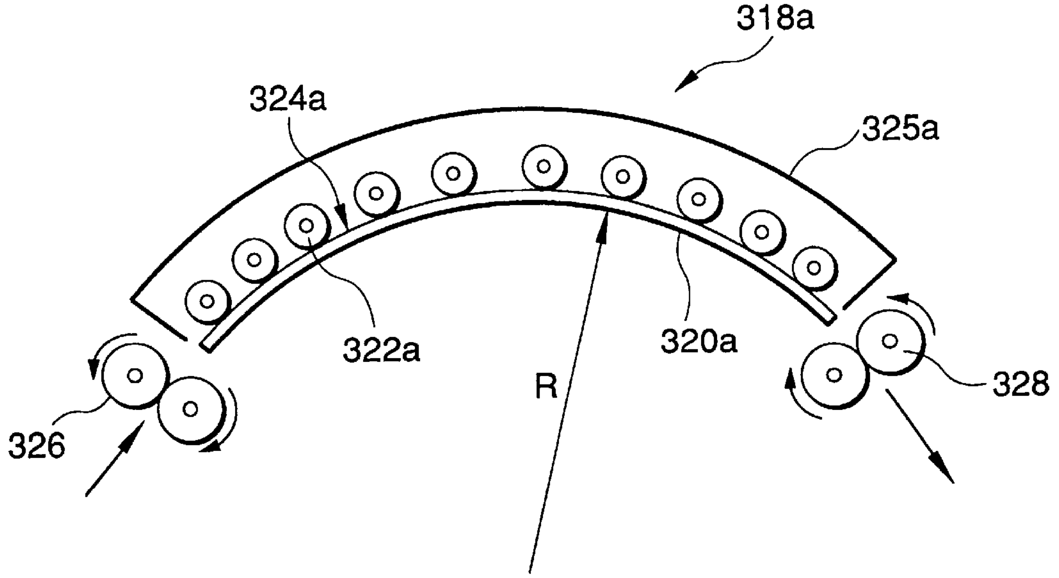
FIG. 16 is a schematic constitution drawing showing another mode of a heat processing apparatus according to the second embodiment of the present invention.

In heat processing apparatus 318 shown in FIG. 14, the constitution is such that sheet A is in contact with the concave side of plate heater 320 (inside transference), and in FIG. 16 sheet A is in contact with the convex side of plate heater 320 (outside transference). Plate heater 320 and 320*a* are each in an arc.

Radius R of each arc shown in FIGS. 14 and 16 is preferably in the range: R>0.05 m, taking the actual length of sheet A and the processing time into consideration.

Further, similarly to the case as shown in FIGS. 4 and 5, it is preferred to arrange pressing rollers 322 so that the distance L respectively between the most upstream end and the most downstream end of plate heater 320 and the most upstream pressing roller 322 and the most downstream pressing roller 322 falls within the range of 0<L<5 mm.

Further, the shape of pressing rollers 122 is preferably cylindrical but it may be spit type pressing rollers 122*n* in which cylindrical parts are thrust in the axial direction as shown in FIG. 6.

Figure 17:
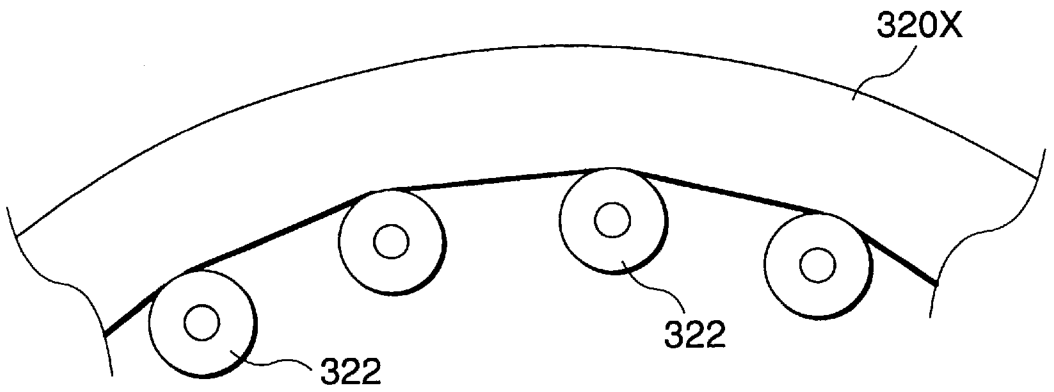
FIG. 17 is a schematic drawing of a principal part showing a cross-sectional shape of contact area with a sheet of a plate heater.
Figure 18:
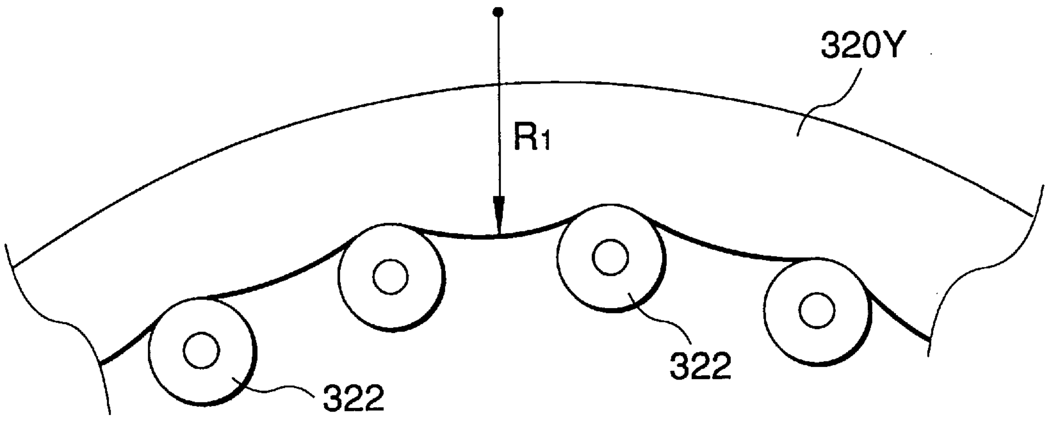
FIG. 18 is a schematic drawing of a principal part showing a cross-sectional shape of contact area with a sheet of a plate heater.

Also, as shown in FIGS. 17 and 18, the contact surface of the plate heater with the sheet can be a combination of a plurality of surfaces.

The shape of the surface of plate heater 320X in FIG. 17 is plane between each of pressing rollers 322 where pressing rollers 322 are not in contact with the sheet. The surface shape of plate heater 320Y in FIG. 18 is slightly convex a little protruding to the roller arranged side between each of pressing rollers 322 where pressing rollers 322 are not in contact with the sheet. In particular, the surface between each roller forms in an arc having a radius of curvature R1 in the figure.

By providing such a shape to the plate heater surface, even at intermediate position between pressing rollers 322 where pressing is not effective, the shape of the plate heater surface in contact with sheet A is reverse to the curve of sheet A during transferring, thereby more uniform and close contact can be obtained.

Radius R1 of each convex surface between each pressing roller 322 as in FIG. 18 is preferably R1>0.01 m or more. If the curvature is too large, transferring resistance occurs and also large curving force works on the sheet to generate scratches and wrinkles.

Figure 19:
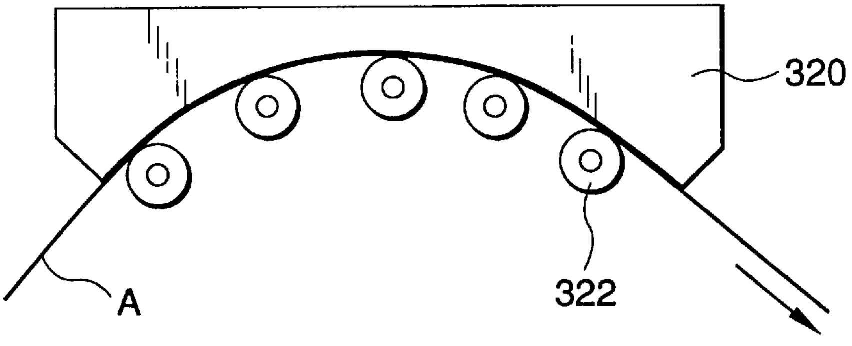
FIG. 19 is a schematic drawing of a principal part showing a cross-sectional shape of a plate heater according to another embodiment.

The opposite side to the sheet contact side of plate heater 320 may be planar for easy adhesion of, e.g., a rubber heater, as shown in FIG. 19.

Figure 20:
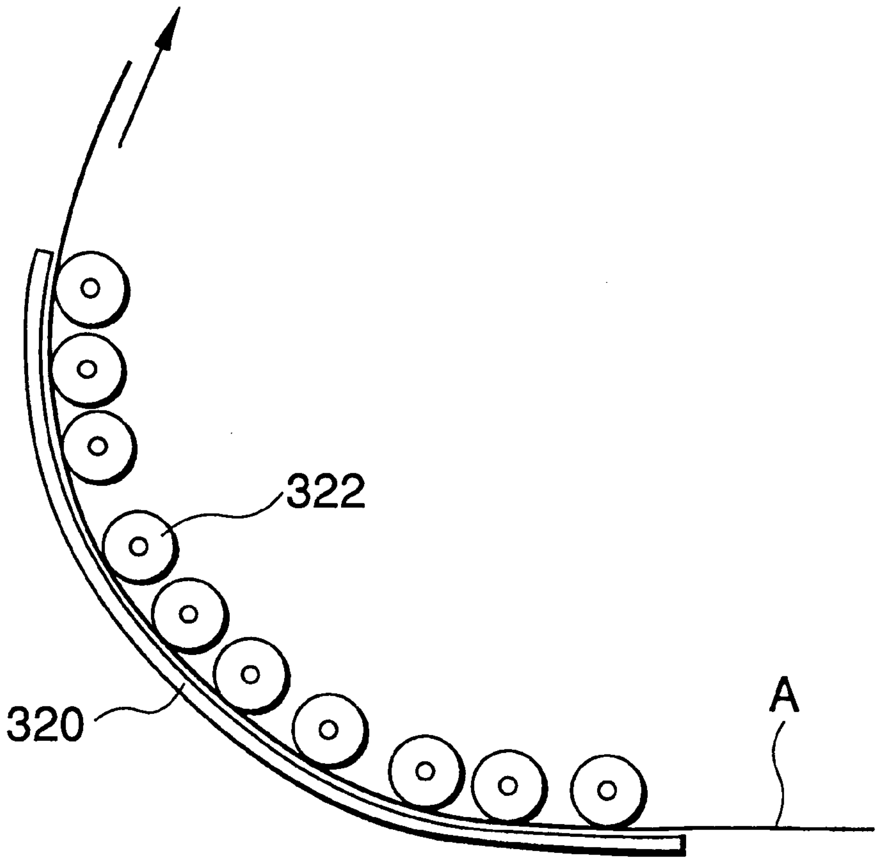
FIG. 20 is a schematic drawing of a principal part showing a specific arrangement of the heat processing apparatus shown in FIG. 14.

Further, for preventing sheet buckling, the constitution in which the pressure in the width direction of pressing rollers 122 becomes uniform at least for a period of time during sheet temperature rise is preferred. For example, in the case of the above-described inside transference, the constitution is applicable such that, as shown in FIG. 20, the inlet part of sheet A of plate heater 320 is made nearly horizontal to make the pressure to the sheet uniform by the weight of pressing rollers 322 by themselves.

The same constitution as described above in the first embodiment of the present invention can be applied to the constitution as to exothermic distribution, heat capacity and exothermic amount of plate heater 320.

Figure 21:
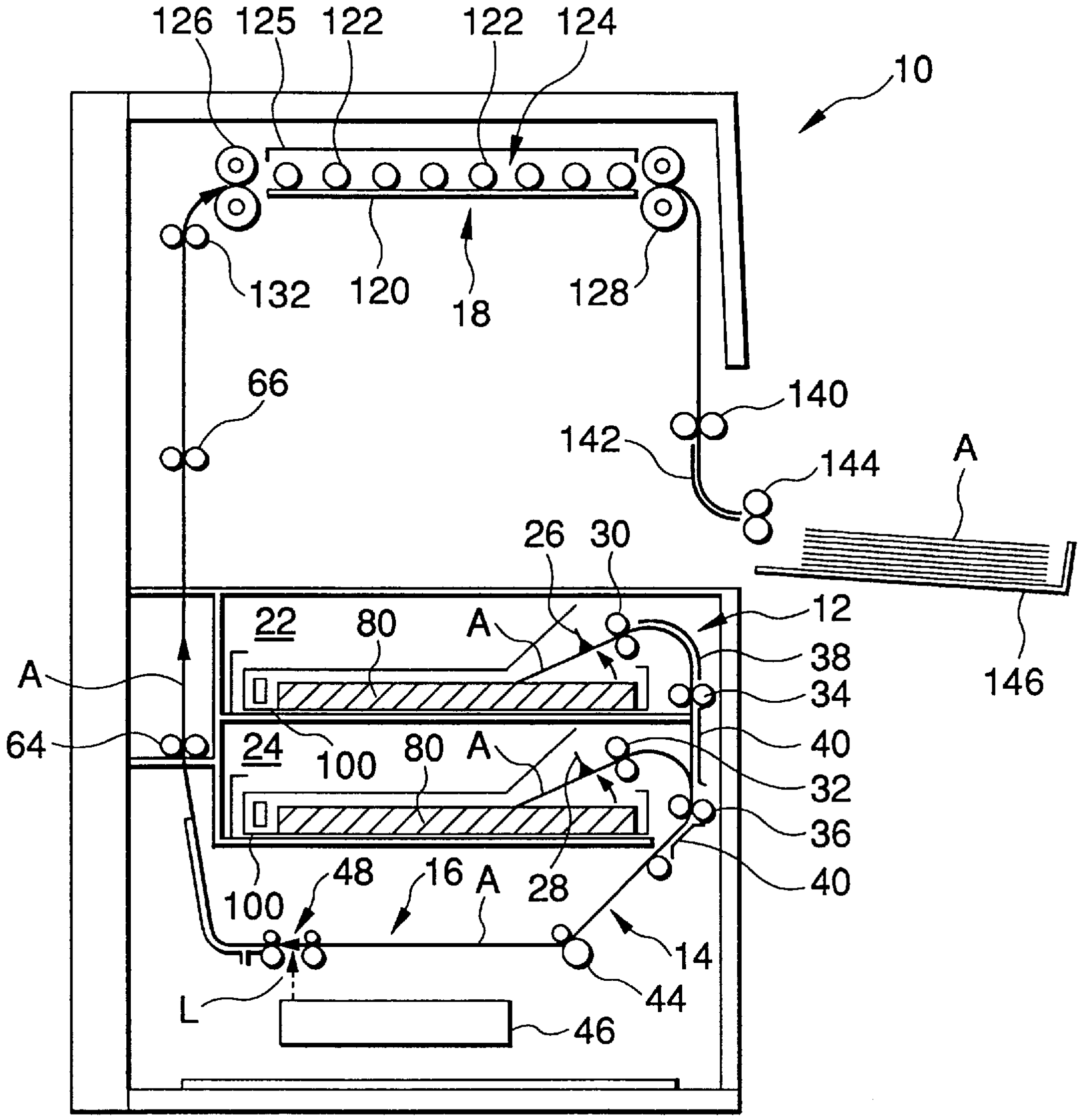
FIG. 21 is a schematic constitution drawing of a heat developing apparatus of the first embodiment using a heat processing apparatus according to the present invention.

FIG. 21 is a schematic constitution drawing of a heat developing apparatus of the first embodiment using a heat processing apparatus according to the present invention. As shown in the drawing, heat developing apparatus 10 is constituted of, in order of transferring route of a heat-developable light-sensitive material or a light-sensitive heat-sensitive recording material (hereinafter referred to as “sheet A”), recording material feeding part 12, sheet-position adjustment part 14, image exposing part 16, and heat processing (developing) apparatus 18 as main constituents.

Recording material feeding part 12 is a part for taking out and feeding sheets A one by one to sheet-position adjustment part 14 positioned downstream of transferring direction of sheets A, which is constituted of loading parts 22 and 24, recording material feeding means having suction cups 26 and 28 arranged at each of the above loading parts, feeding roller pairs 30 and 32, transferring roller pairs 34 and 36, and transferring guides 38, 40 and 42.

Loading parts 22 and 24 are parts to load magazine 100 containing sheets A at a determined position. In FIG. 21, there are two loading parts 22 and 24 and each loading part is generally loaded with magazine 100 containing sheets A having different sizes respectively [e.g., half-cut size (i.e., 356×432 mm) for CT and MRI, B4 size (i.e., 275×364 mm) for FCR (Fuji computed radiography)].

Recording material feeding means arranged at each of loading parts 22 and 24 conveys sheets A to feeding roller pairs 30 and 32 arranged at each of loading parts 22 and 24 by adsorbing and holding sheets A by suckers 26 and 28 and moving suckers 26 and 28 by well-known moving means such as link-mechanism, etc.

Examples of sheets A include a heat-developable recording material and a light-sensitive heat-sensitive recording material.

A heat-developable recording material is a recording material on which an image is recorded (exposed) with at least one optical beam, e.g., a laser beam, followed by heat development to develop (form) colors.

Further, a light-sensitive heat-sensitive recording material is a recording material on which an image is recorded (exposed) with at least one optical beam, e.g., a laser beam, followed by heat development to develop colors, or an image is recorded by heat mode (heat) of a laser beam or a thermal head and colors are developed at the same time, and then fixation is effected by light irradiation.

Sheet A is processed to sheets and, in general, made into bundles of a prescribed unit, e.g., 100 sheets, etc., and packaged in a bag or a belt as package 80.

Sheet A at loading part 22 fed to feeding roller pair 30 is transferred through transferring roller pairs 34 and 36 being guided by transferring guides 38, 40 and 42, while sheet A at loading part 24 fed to feeding roller pair 32 is transferred through transferring roller pair 36 being guided by transferring guides 40 and 42, respectively, to sheet-position adjustment part 14 of the downstream.

Sheet-position adjustment part 14 is a part where the position of sheet A is adjusted to the orthogonal direction against the transferring direction (hereinafter referred to as "width direction"), thereby the position of sheet A in the main scanning direction in image exposing part 16 of the downstream is adjusted to take so-called side resist, and the material is transferred to image-exposing part 16 of the downstream through transferring roller pair 44.

Methods of taking side resist in sheet-position adjustment part 14 are not particularly restricted. For example, there are exemplified various well-known methods, such as a method of using a resist plate which adjusts the position of sheet A in contact with one edge face of the width direction of the material and a pushing/moving means, e.g., a roller, which pushes and moves sheet A in the width direction to make an edge face of the material contact with a resist plate; a method of using the above resist plate and a guide plate which is movable in accordance with the size of sheet A in the width direction, which also makes the material contact with the resist plate by regulating the transferring direction of sheet A by the width direction, etc.

Sheet A transferred to sheet-position adjustment part 14 is transferred to image exposing part 16 of the downstream by transferring roller pair 44 after undergoing position adjustment in the orthogonal direction against the transfer-ring direction as described above.

Image exposing part 16 is a part where sheet A is imagewise exposed by optical beam scanning exposure, which is constituted of exposing unit 46 and sub-scanning transferring means 48.

Figure 22:
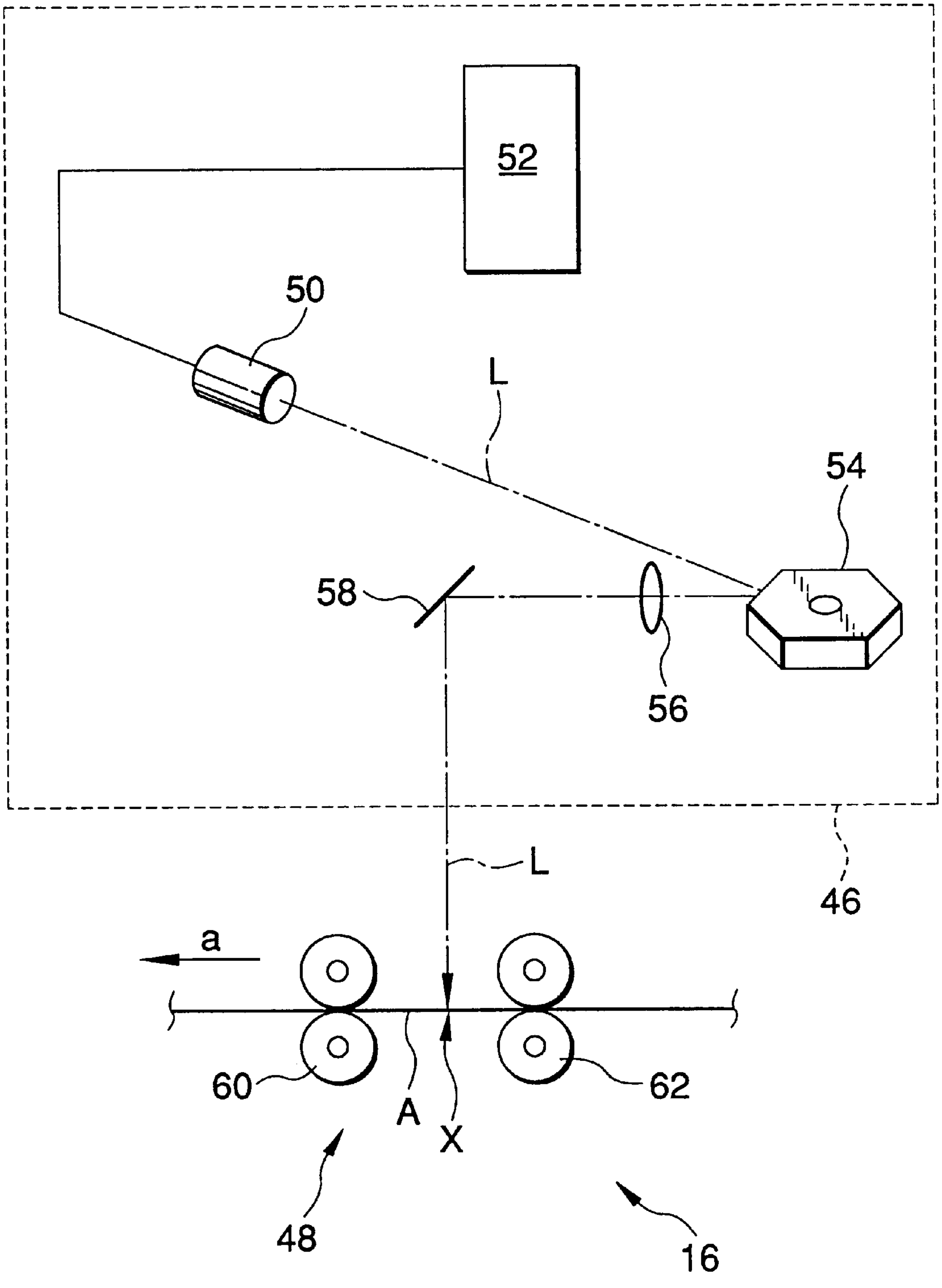
FIG. 22 is a schematic drawing of a principal part of an exposing unit in the heat developing apparatus in FIG. 21.

As shown in FIG. 22, exposing unit 46 is a well-known optical beam scanning apparatus, wherein optical beam L modulated according to the image to be recorded is deflected in the main scanning direction (the width direction of sheet A) to be subjected to incidence at predetermined recording position X. Exposing unit 46 is constituted of light source 50 emitting optical beam L in narrow wavelength region according to spectral sensitivity characteristics of sheet A, recording controlling apparatus 52 which drives light source 50, polygonal mirror 54 which is a light-deflector, fθ lens 56, and down mirror 58.

In addition to the above, various members which are arranged in well-known optical beam scanning apparatuses are provided in exposing unit 46, such as a collimator lens and a beam expander which adjust optical beam L emitted from the light source, a face fall compensation optical system, a mirror for optical path adjustment, etc., according to necessity.

Record-controlling apparatus 52 drives light source 50 with modulating pulse width according to the image to be recorded and emits pulse width-modulated optical beam L according to the image to be recorded.

Optical beam L emitted from light source 50 is deflected by polygonal mirror 54 in the main scanning direction, modulated by fθ lens 56 so as to form the image at recording position X, and the optical path is changed by down mirror 58 and subjected to incidence at recording position X.

FIG. 22 is the example for monochromatic image recording and exposing unit 46 comprises one light source 50 but when the exposing unit is used for color image recording, an exposing unit having three light sources emitting optical beams of wavelengths corresponding to spectral sensitivity characteristics of R (red), G (green) and B (blue) of the color light-sensitive material is used.

On the other hand, sub-scanning transferring means 48 has a pair of transferring roller pairs 60 and 62 arranged with recording position X (scanning line) between, and transfers sheet A in the sub-scanning direction orthogonal against the above-described main scanning direction (in the direction of arrow a in FIG. 22) with retaining sheet A at recording position X.

Here, as described above, since pulse width-modulated optical beam L according to the image to be recorded has been deflected in the main scanning direction, sheet A is two dimensionally scanning exposed by optical beam and a latent image is recorded.

The example in FIG. 22 is the constitution of directly modulating light source 50 to modulate the pulse width, but the present invention is also applicable to an apparatus of modulating pulse number, or an apparatus of indirect modulation using an external modulator such as AOM (acoustic modulator).

Image recording by analog intensity modulation is also effective.

As shown in FIG. 21, sheet A transferred to image exposing part 16 is exposed by optical beam scanning, e.g., a laser beam, and after a latent image is formed on sheet A, transferred to heat processing apparatus 18 by transferring rollers 64 and 66. At that time, dusts on the front and back surfaces of sheet A are removed by dust-removing roller 136.

Heat processing apparatus 18 for use in the present invention is a heat processing apparatus as described in the above first or second embodiment of the present invention.

Heat processing apparatus 18 has the foregoing constitution but it is preferred to preheat sheet A at a temperature not higher than the developing temperature before sheet A reaches heat developing part 18. Uneven development can further be reduced by this preheating. Further, as shown in FIG. 21, it is preferred to install adhesive dust removing roller 132 just before heat processing apparatus 18 to remove dusts on sheet A to be fed to heat processing apparatus 18. Thus, uneven development due to adhesion of dusts can be prevented.

Sheet A discharged from heat processing apparatus 18 is introduced to guide plate 142 by transferring pair rollers 140 and collected and delivered to tray 146 through discharging pair rollers 144.

Figure 23:
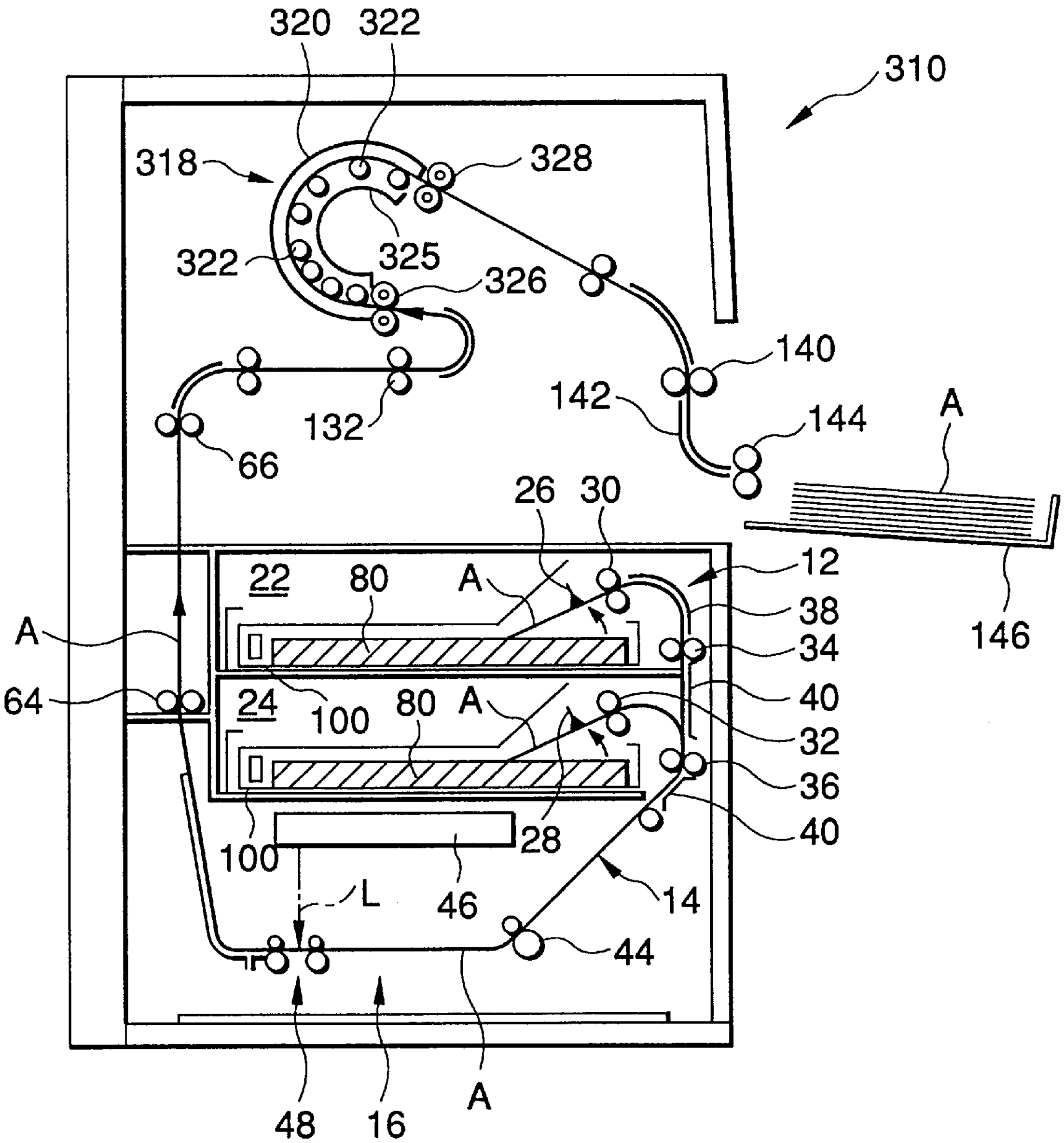
FIG. 23 is a schematic constitution drawing of a heat developing apparatus of the second embodiment using a heat processing apparatus according to the present invention.

FIG. 23 is a schematic constitution drawing of a heat developing apparatus of the second embodiment using a heat processing apparatus according to the present invention. As shown in the drawing, heat developing apparatus 310 is constituted of, in order of transferring route of a heat-developable light-sensitive material or a light-sensitive heat-sensitive recording material (hereinafter referred to as "sheet A"), recording material feeding part 12, sheet-position adjustment part 14, image exposing part 16 and heat processing apparatus 318 as main constituents.

With respect to the second embodiment, the different point from the heat developing apparatus of the first embodiment described in FIG. 21 is that the heat processing apparatus in the second embodiment is a curved type heat processing apparatus 318. As the constitutional parts of the heat developing apparatus of the second embodiment are the same as those of the first embodiment except for the heat processing apparatus, descriptions regarding the constitution and functions thereof are omitted.

The arrangement of heat processing apparatus 318 applied to the second embodiment has the constitution as shown in FIG. 20. The constitution is such that the inlet part of sheet A of curved plate heater 320 is made nearly horizontal to make the pressure to the sheet uniform by the weight of pressing rollers 322 by themselves.

Further, the transferring means to heat processing apparatus 318 is the same as the transferring means used in the heat processing apparatus shown in FIG. 14. When pressing rollers 322 has the function as a transferring means, the constitution as shown in FIG. 15 is applicable. Further, when pressing rollers 322 functions only as a pressing means, the transferring means shown in FIG. 2 or FIG. 3 can be applied in place of feeding rollers 326.

Figure 24:
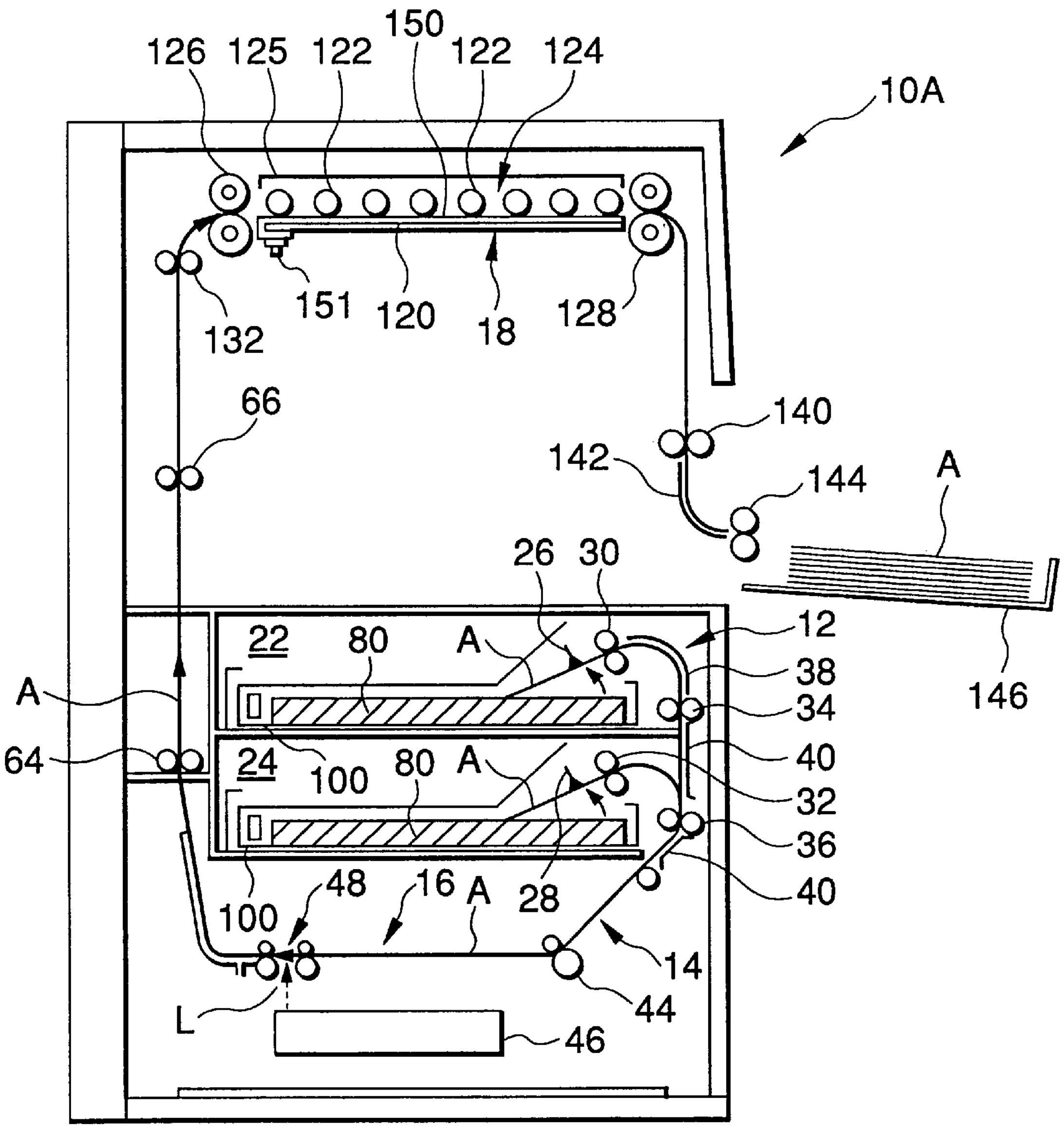
FIG. 24 is a schematic constitution drawing showing the case of applying the constitution to improve the sliding property of a sheet to the heat developing apparatus shown in FIG. 21.

FIG. 24 is a schematic constitution drawing applying the constitution to improve the sliding property of sheet A to a heat processing apparatus in the heat developing apparatus of the first embodiment using a heat processing apparatus according to the present invention. Similarly to the heat processing apparatus as shown in FIG. 11, lubricating sheet 150 is provided in this apparatus. As the constitutional parts of the heat developing apparatus of this embodiment are the same as those of the first embodiment except for the heat processing apparatus, descriptions regarding the constitution and functions thereof are omitted.

According to this constitution, the same function and effect as in the heat processing apparatus shown in FIG. 11 can be obtained, smooth moving of sheet A on the plate heater can be realized and generation of scratches, wrinkles and buckling can be prevented.

The same constitution as described above in the first embodiment of the present invention can be applied to the constitution as to exothermic distribution, heat capacity and exothermic amount of the plate heater. In particular, with respect to heat capacity, the comparison of image qualities of the case using the constitution shown in FIG. 9 with the case using the conventional constitution was conducted. The results obtained are shown in Table 3 below.

Comparative conditions in Table 3 were as follows:

A rubber heater was used, the electric power density was 5 kw/$m^2$ and uniform at every place.

The plate temperature was set up at 120° C., and when the temperature reached the prescribed temperature, 20 sheets of a half-cut size (35.6×43.2 cm) sheet A were continuously heat processed with the interval of 8 seconds.

TABLE 3

| | Comparative Example | Example |
|---|---|---|
| Plate thickness | Uniform thickness of 10 mm | Thickness gradient was provided in straight line, Inlet side: 12.5 mm Outlet side: 7.5 mm |
| Development of half-cut size, Temperature unevenness (in-plane) | ΔT = 0.15 | ΔT = 0.1 |
| Development of half-cut size, Temperature unevenness (face-to-face) | ΔT = 0.2 | ΔT = 0.15 |

As can be seen from the results in Table 3, the temperature fluctuation of the plate heater is less and the quality of heat development processing is improved with heater 120 having heat capacity distribution as compared with the heater of the heat processing apparatus having the uniform thickness.

The comparison of image qualities of the case in which the electric power density of the heater was gradually decreased from the inlet side of sheet A to the outlet to change the exothermic amount with the conventional case of the heater having even electric power density was conducted. The results obtained are shown in Table 4 below.

Comparative conditions in Table 4 were as follows:

The thickness of the plate was uniformly 10 mm in the transferring direction of the sheet.

The plate temperature was set up at 120° C., and when the temperature reached the prescribed temperature, 20 sheets of a half-cut size (35.6×43.2 cm) sheet A were continuously heat processed with the interval of 8 seconds.

TABLE 4

| | Comparative Example | Example |
|---|---|---|
| Electric power density | Uniform density of 5 kw/$m^2$ | Gradient was provided in electric power density in straight line, Inlet side: 7.5 km/$m^2$ Outlet side: 2.5 km/$m^2$ |
| Development of half-cut size, Temperature unevenness (in-plane) | ΔT = 0.15 | ΔT = 0.08 |
| Development of half-cut size, Temperature unevenness (face-to-face) | ΔT = 0.2 | ΔT = 0.12 |

As can be seen from the results in Table 4, by changing wiring of resistance wires densely or sparsely in the transferring direction of sheet A, temperature fluctuation of plate heater 120 is less and the quality of heat development processing can be improved as compared with the plate heater having even electric power density.

Coating 121 described in FIG. 13 can be adopted to realize smooth moving of sheet A on the plate heater.

In any of the above-described embodiments, it is preferred that the surface of sheet A which is in contact with the surface of a plate heater should be a non-image-forming layer.

The reason for this is that when an image-forming layer is in contact with the surface of a plate heater, white peppers are generated (local density reduction of the image-forming layer) due to dust adhesion, and that the peeling off of the image-forming layer is liable to occur as the sheet temperature becomes high and sticky during heat development. Further, in the case of using the first recording material disclosed in Japanese Patent Application No. 9-229684, there are anxieties of heat conduction failure between the recording material and the heater and contamination of the apparatus due to the volatile material from the recording material.

Further, for effective thermal decolorization, it is preferred to arrange the layer containing a thermal decolorant on the side in contact with the surface of plate heater 120.

In addition, it is effective that the surface of sheet A is matted taking transferring property into consideration. When the surface is matted using a matting agent, the particle size of the matting agent is preferably from 0.1 to 10 $\mu$m.

Figure 25:
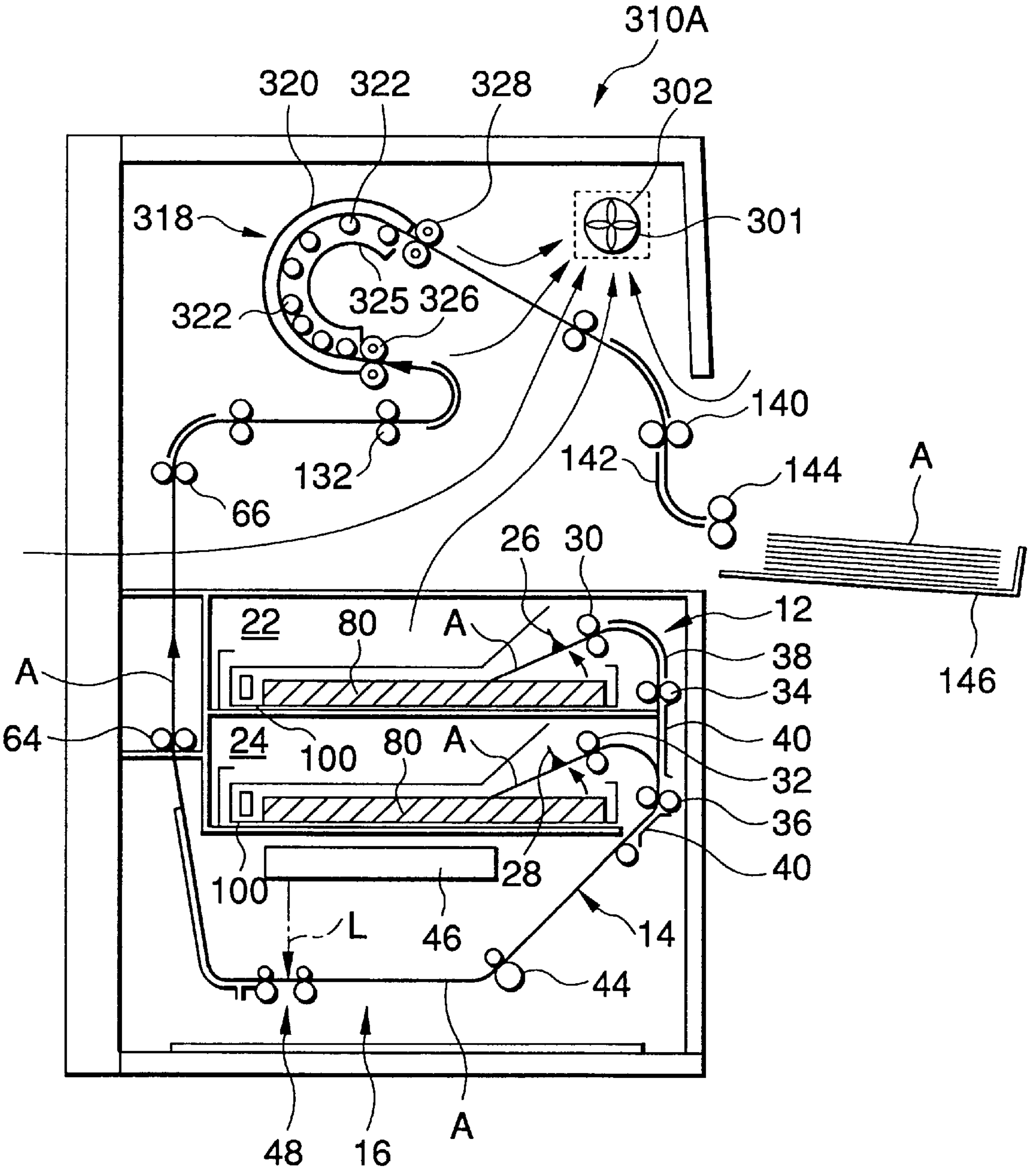
FIG. 25 is a schematic constitution drawing showing the case of applying an internal air cleaning unit to the heat developing apparatus shown in FIG. 23.

FIG. 25 is a schematic constitution drawing showing the case of applying an internal air cleaning unit to the heat developing apparatus according to the present invention.

As the application example, the heat developing apparatus shown in FIG. 23 is used but this internal air cleaning unit is applicable to another embodiment.

In FIG. 25, exhaust fan 301 is installed on the wall of heat developing apparatus 310, in particular, in the vicinity of heat processing apparatus 318, and filter 302 to catch generating gas is fixed by frame 303 at inner position of the apparatus of exhaust fan 301. Gas generated by heat development is caught by this internal air cleaning unit.

Figure 26:
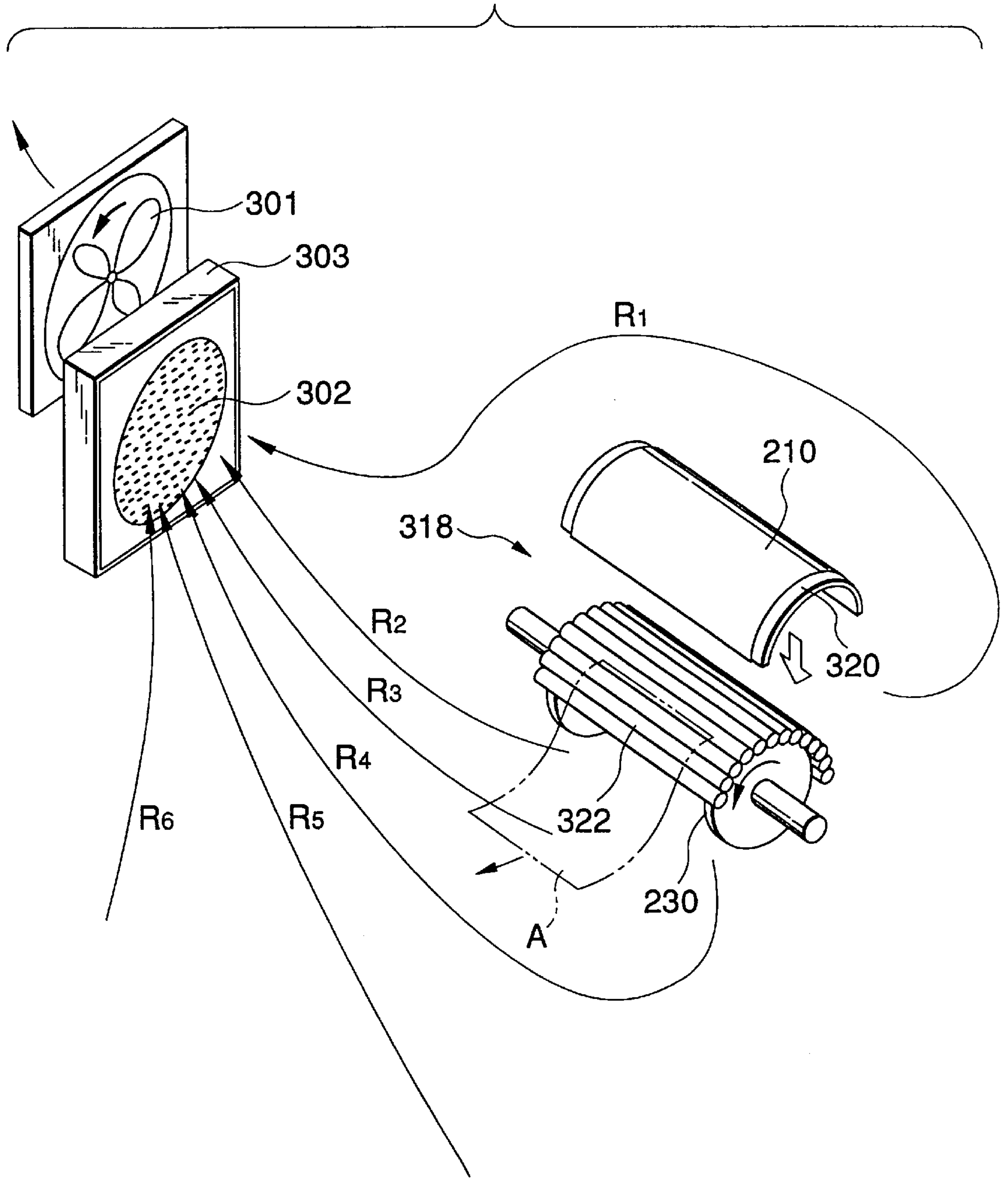
FIG. 26 is a conceptual drawing showing the function of the internal air cleaning unit shown in FIG. 25.

FIG. 26 is a conceptual drawing showing the function of this internal air cleaning unit.

The gas generated from heat processing apparatus 318 is guided along by route R1 from the inlet of heat processing apparatus 318, route R2 from the outlet, route R3 from sheet A, route R4 from the driving roller, route R5 from the heat developing apparatus other than heat processing apparatus 318, and route R6 from the out of the apparatus, cleaned through filter 302, and then exhausted by exhaust fan 301.

Examples of filter materials include the following various materials:

A heat conductive condensation accumulator: metal mesh, etc.

A non-heat conductive condensation accumulator: sponge, paper, cloth, nonwoven fabric, etc.

A fine particle filter: the same as the above

An absorbing block:

(1) A fine particle filter: activated carbon, a ceramic powder, etc.

Figure 27:
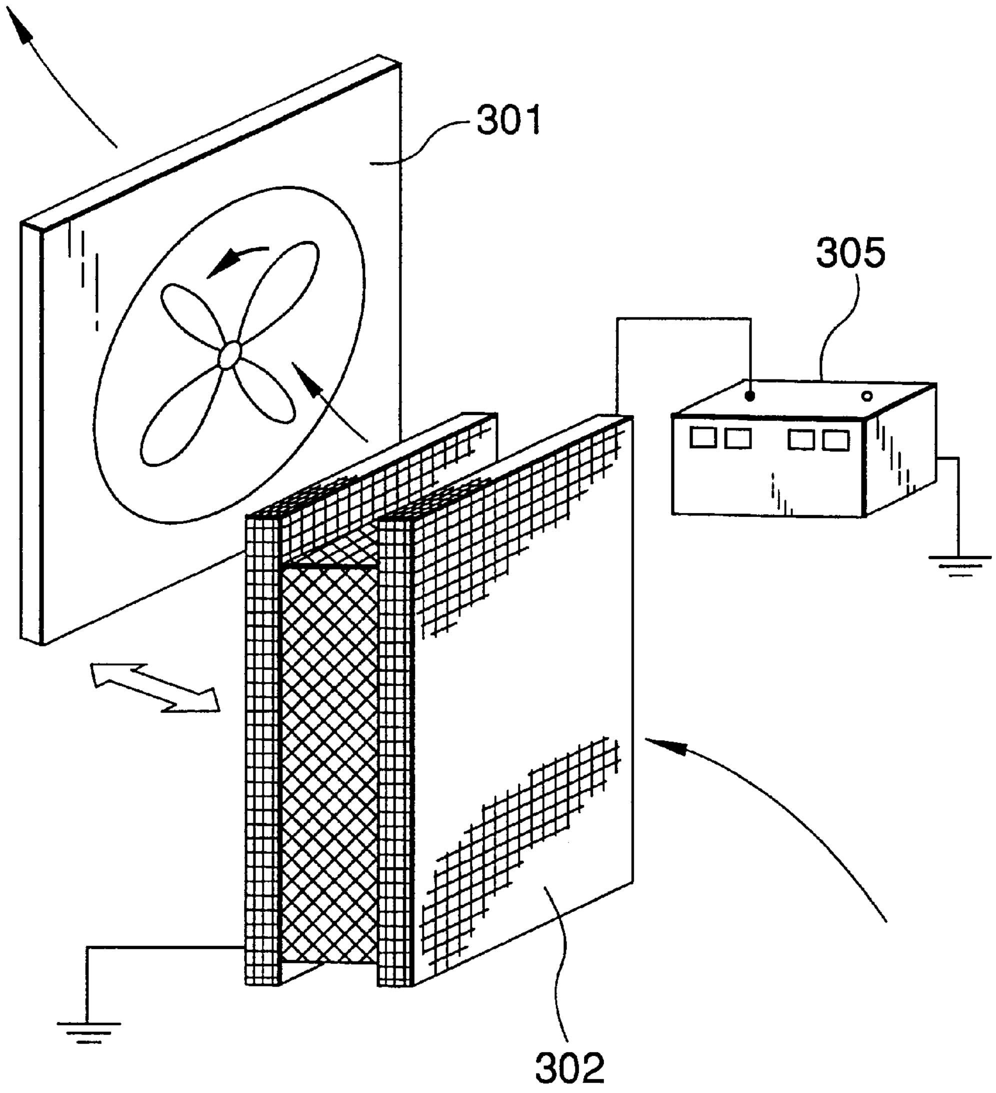
FIG. 27 is a schematic constitution drawing of a heat conductive condensation accumulator plus an electrostatic filter.

(2) A bound particle filter: bound activated carbon, bound ceramic powder (3) A chemical filter An electrostatic filter: materials having electrostatic adsorbability As the constitution comprising these filters in combination, the following a) to m) can be exemplified.

a) Heat conductive condensation accumulator+fine particle filter+absorbing block b) Non-heat conductive condensation accumulator+fine particle filter+absorbing block c) Fine particle filter+only absorbing block d) Heat conductive condensation accumulator+absorbing block e) Fine particle filter+absorbing block f) Heat conductive condensation accumulator+fine particle filter g) Only heat conductive condensation accumulator h) Only non-heat conductive condensation accumulator i) Only fine particle filter j) Only absorbing block k) Heat conductive condensation accumulator+electrostatic filter l) Non-heat conductive condensation accumulator+electro-static filter m) Only electrostatic filter FIG. 27 is a schematic constitution drawing of k) a heat conductive condensation accumulator plus an electrostatic filter.

Filter 302 comprising wire gauze and the like is connected with high voltage electric source 305, ions are generated by high voltage, fine particles, etc., are caught by ions generated and exhausted by exhaust fan 301.

Sheet A will be described in detail below.

A heat-developable light-sensitive recording material (hereinafter referred to as "first recording material") comprises a support having on one side of the support an image-forming layer comprising a binder 50% or more of which is a latex and an organic silver salt-reducing agent.

When the first recording material is exposed, a photocatalyst such as light-sensitive silver halide forms a latent image nucleus, and when the material is heated, silver of an organic silver salt which is ionized by the function of a reducing agent migrates and combined with light-sensitive silver halide to form crystal silver, thereby an image is formed.

The organic silver salt contained in the image-forming layer of this recording material is comparatively stable against light, but it is a silver salt which forms a silver image when heated at 80° C. or more in the presence of an exposed photocatalyst (a latent image of light-sensitive silver halide, etc.) and a reducing agent, and it may be desalted, if necessary.

Examples of such organic silver salts include silver salts of organic acids (preferably silver salts of long chain fatty carboxylic acid having from 10 to 30 carbon atoms) and complexes of organic and inorganic silver salts ligands of which have complex stability constant of from 4.0 to 10.0, specifically silver behenate, silver arachidate, silver stearate, silver oleate, silver laurate, silver caproate, silver myristate, silver plamitate, silver maleate, silver fumarate, silver tartrate, silver linoleate, silver butyrate and silver camphorate.

Also, silver salts of compounds containing a mercapto group or a thione group and derivatives of these compounds can also be preferably used as such organic silver salts. Specific examples thereof include silver salts of 3-mercapto-4-phenyl-1,2,4-triazole, silver salts of 2-mercaptobenzimidazole, silver salts of 2-mercapto-5-aminothiadiazole, silver salts of thioglycolic acid (e.g., S-alkylthioglycolic acid), silver salts of dithiocarboxylic acid (e.g., silver salts of dithioacetic acid), silver salts of thioamide, silver salts of 5-carboxyl-1-methyl-2-phenyl-4-thiopyridine, silver salts of mercaptotriazine, and silver salts of 2-mercaptobenzoxazole.

Configurations of such organic silver salts are preferably acicular crystals having a short axis and a long axis, specifically having a short axis of from 0.01 to 0.20 μm and a long axis of from 0.10 to 5.0 μm.

Organic silver salts are preferably monodisperse, specifically the percentages of the values obtained by dividing standard deviations of each of a short axis and a long axis by the values of a short axis and a long axis, respectively are preferably 100% or less.

It is preferred to make these organic silver salts solid fine particle dispersion using a well-known dispersant, e.g., polyacrylic acid, polyvinyl alcohol, polyvinyl pyrrolidone, etc., with a view to obtaining fine particles having a small particle size and free of agglomeration.

Solid fine particle dispersion of organic silver salts can be obtained according to well-known mechanical fine particle dispersion methods using a ball mill, a vibrating ball mill, etc., in the presence of a dispersant.

Besides mechanical dispersion methods, solid fine particle dispersion can be obtained by roughly dispersing an organic silver salt in a solvent and then varying pH in the presence of a dispersing aid.

The amount of organic silver salts is preferably from 0.1 to 5 g/liter and more preferably from 1 to 3 g/liter in terms of silver amount.

As reducing agents for reducing organic silver salts, arbitrary compounds capable of reducing silver ions to metal silver can be used, preferably an organic compound. Various kinds of well-known reducing agents which are used for recording materials using organic silver salts, e.g., those disclosed in Japanese Patent Application No. 57-82829, JP-A-6-3793 (the term "JP-A" as used herein means an "unexamined published Japanese patent application"), and U.S. Pat. No. 5,464,738 can be used as such a reducing agent.

Specific examples include amidoxime, e.g., phenyl amidoxime; azine, e.g., 4-hydroxy-3,5-dimethoxybenzaldehyde azine; hydroxamic acid, e.g., phenylhydroxamic acid; α-cyanophenyl acetic acid derivatives, e.g., ethyl-α-cyano-2-methylphenylacetate; bis-β-naphthol, e.g., 2,2'-dihydroxy-1,1'-binaphthyl; 5-pyrazolone, e.g., 3-methyl-1-phenyl-5-pyrazolone; reductone, e.g., dimethylaminohexose reductone; sulfonamidophenol reducing agents, e.g., 2,6-dichloro-4-benzenesulfonamidophenol; chroman, e.g., 2,2-dimethyl-7-t-butyl-6-hydroxychroman; 1,4-dihydropyridine, e.g., 2,6-dimethoxy-3,5-dicarboethoxy-1,4-dihydropyridine; bisphenol, e.g., bis(2-hydroxy-3-t-butyl-5-methylphenyl)methane, 2,2-bis(4-hydroxy-3-methylphenyl)propane, 4,4-ethylidene-bis(2-t-butyl-6-methylphenol), 1,1-bis(2-hydroxy-3,5-dimethylphenyl)-3,5,5-trimethylhexane, and 2,2-bis(3,5-dimethyl-4-hydroxyphenyl)propane; ascorbic acid derivatives, e.g., 1-ascorbyl palmitate; and chromanol (tocophenol); and bisphenol and chromanol are particularly preferably used.

In addition to the above, well-known photographic developers such as Phenidone®, hydroquinone and catechol are preferably used, and hindered phenol reducing agents are particularly preferably used.

Reducing agents may be added in the same manner as the addition of a solution, a powder or a solid fine particle dispersion. Dispersion of solid fine particles is performed by well-known fine dispersion methods (e.g., using a ball mill, a vibrating ball mill, and the like). A dispersing aid may be used in solid fine particle dispersion.

The amount of reducing agents is preferably from 5 to 50 mol % per mol of silver of the side on which an image-forming layer is provided. A reducing agent is fundamentally added to an image-forming layer but may be added to other layers on the same side on which an image-forming layer is provided. In such a case, a reducing agent is preferably added in a little lots of amount, e.g., from 10 to 50 mol %. Further, a reducing agent may be in the form of a precursor which is induced so as to effectively exhibit a function only at development time.

The image-forming layer of this recording material contains a substance which becomes a photocatalyst when exposed, e.g., light-sensitive silver halide (hereinafter referred to as "silver halide").

The composition of silver halide is not restricted and any of silver chloride, silver chlorobromide, silver bromide, silver iodobromide, silver iodochlorobromide and silver iodide can be used, but silver bromide and silver iodobromide are preferably used.

The grain size of these silver halide is preferably 0.20 μm or less for preventing white turbidity after image formation and in particular cubic grains and tabular grains are preferred.

It is preferred for silver halide grains to contain at least one metal complex selected from rhodium, rhenium, ruthenium, osmium, iridium, cobalt, mercury and iron in an amount of from 1 nmol to 10 mmol per mol of silver. These metal complexes are disclosed in detail in JP-A-7-22549.

Metal complexes may be contained in silver halide uniformly or may be contained locally in a core part or a shell part in high concentration, and the contained phase is not particularly limited.

Silver halide grains are preferably chemically sensitized.

Methods of chemical sensitization are not particularly limited and, for example, a sulfur sensitization method, a selenium sensitization method, a tellurium sensitization method using diacyl tellurides and bis(oxycarbonyl) tellurides, a noble metal sensitization method using chloroauric acid and potassium chloroaurate, a reduction sensitization method using ascorbic acid and thiourea dioxide can be used.

A method of ripening while maintaining the pH of the emulsion 7 or more and pAg of the emulsion 8.3 or less, and a reduction sensitization method of introducing a single addition part of the silver ion during the grain formation are also usable.

The addition amount of these silver halides is preferably from 0.01 to 0.5 mol per mol of the organic silver salt.

When silver halide and organic silver salt are prepared separately, silver halide grains and organic silver salt as prepared may be mixed using a high speed stirrer, a ball mill, a sand mill, a colloid mill, a vibrating mill, a homogenizer, etc., or silver halide grains as prepared may be mixed with organic silver salt at appropriate time during preparation of organic silver salt.

Further, with respect to preparation of silver halide and a mixing method with an organic silver salt, so-called halidation comprising halogenizing a part of silver of an organic silver salt with an organic or inorganic halide is also preferably used. Examples of organic halides for use thereat include N-halogenoimide (e.g., N-bromosuccinimide) and a halogenated quaternary nitrogen compound (e.g., tetrabutylammonium bromide), and examples of inorganic halides include halogenated alkali metals (e.g., lithium bromide and potassium iodide), halogenated ammonium (e.g., ammonium bromide), halogenated alkaline earth metals (e.g., calcium bromide), and halogen molecules (e.g., bromine and iodine). The addition amount of halides at halidation is from 1 to 500 mmol per mol of the organic silver salt in terms of a halogen atom.

The image-forming layer of this recording material contains a latex comprising a water-insoluble hydrophobic polymer dispersed in a water-soluble dispersion medium as fine particles in an amount of 50 wt % or more based on the entire binder. Moreover, other layers may have the same constitution, if necessary.

The state of latex dispersion may be any of the dispersion in which a polymer is emulsified in a dispersion medium, the emulsion polymerization dispersion, the micelle dispersion, or the dispersion in which a polymer molecule has partially hydrophilic constitution and the molecular chain itself is molecularly dispersed. Further, a core/shell type latex may be used as well as a generally used latex having homogeneous constitution.

These latices are described in Taira Okuda, Hiroshi Inagaki, *Synthetic Resin Emulsion*, published by Kobunshi Kanko-kai (1978), Takaaki Sugimura, Yasuo Kataoka, Soichi Suzuki, Keiji Kasahara, *Application of Synthetic Latex*, published by Kobunshi Kanko-kai (1993), Soichi Muroi, *Chemistry of Synthetic Latex*, published by Kobunshi Kanko-kai (1970), etc.

As polymers of these latices, acrylic resins, vinyl acetate resins, polyester resins, polyurethane resins, rubber resins, vinyl chloride resins, vinylidene chloride resins, polyolefin resins, etc., can be exemplified.

These polymers may be straight chain or branched, or may be crosslinked. Polymers may be homopolymers which are polymers of single monomers or copolymers which are polymers of two or more kinds of monomers. Either of a random copolymer or a block copolymer may be used as a copolymer.

The number average molecular weight of the polymers is from 5,000 to 1,000,000, preferably from 10,000 to 100,000. If the molecular weight is too small, mechanical strength of the light-sensitive layer is insufficient and if it is too large, film-forming property is disadvantageously deteriorated.

Specific examples of these polymers include methyl methacrylate/ethyl acrylate/methacrylic acid copolymers, methyl methacrylate/2-ethylhexyl acrylate/styrene/acrylic acid copolymers, styrene/butadiene/acrylic acid copolymers, styrene/butadiene/divinylbenzene/methacrylic acid copolymers, methyl methacrylate/vinyl chloride/acrylic acid copolymers, vinylidene chloride/ethyl acrylate/acrylonitrile/methacrylic acid copolymers, etc.

Various commercially available polymers can also be used. There are exemplified, for example, as an acrylic resin, Cebian A-4635, etc. (manufactured by Daicel Chemical Industries Ltd.), as a polyester resin, FINETEX ES650, etc. (manufactured by Dainippon Chemicals and Ink Co., Ltd.), as a polyurethane resin, HYDRAN AP10, etc. (manufactured by Dainippon Chemicals and Ink Co., Ltd.), as a rubber resin, LACSTAR 7310K, etc. (manufactured by Dainippon Chemicals and Ink Co., Ltd.), as a vinyl chloride resin, G351, etc. (manufactured by Nippon Zeon Co., Ltd.), as a vinylidene chloride resin, L502, etc. (manufactured by Asahi Chemical Industry Co., Ltd.), and as a polyolefin resin, Chemipearl S120, etc. (manufactured by Mitsui Petrochemical Industries, Ltd.).

These polymers may be used alone or two or more kinds may be blended before use, if necessary.

The average particle size of dispersed particles in a latex is preferably from about 1 to about 50,000 nm, more preferably from about 5 to about 1,000 nm. The particle size distribution of dispersed particles is not particularly restricted and those having broad particle size distribution and monodisperse particle size distribution may be used.

The minimum film forming temperature (MFT) of the latex is preferably from −30 to 90° C., more preferably from 0 to 70° C.

As described above, the image-forming layer of this recording material preferably comprises 50 wt % or more, particularly preferably 70 wt % or more, of latex based on the entire binder.

Moreover, this image-forming layer may contain, if necessary, hydrophilic polymers such as gelatin, polyvinyl alcohol, methyl cellulose, hydroxypropyl cellulose, carboxy-methyl cellulose, or hydroxypropylmethyl cellulose, within the range of 50 wt % or less based on the entire binder. The addition amount of these hydrophilic polymers is preferably 30 wt % or less based on the entire binder amount in the light-sensitive layer.

Further, dispersed particles of latices (polymers) preferably have equilibrium moisture content at 25° C., 60% RH of 2 wt % or less, more preferably 1 wt % or less.

The image-forming layer of this recording material or other layers on the same side on which the image-forming layer is provided preferably contains additives known as a color toning agent in an amount of preferably from 0.1 to 50 mol % per mol of silver for the purpose of improving optical density. The color toning agent may be in the form of a precursor which is induced so as to effectively exhibit a function only at development time.

Various well-known color toning agents which are used in recording materials can be used in the present invention, and specific examples of such color toning agents include a phthalimide compound (e.g., phthalimide, N-hydroxyphthalimide, etc.); cyclic imide (e.g., succinimide, pyrazolin-5-one, etc.); naphthalimide (e.g., N-hydroxy-1,8-naphthalimide, etc.); a cobalt complex (e.g., cobalt hexaminetrifluoroacetate, etc.); mercaptan (e.g., 3-mercapto-1,2,4-triazole, 2,4-dimercaptopyrimidine, etc.); and a phthalazinone derivative (e.g., 4-(1-naphthyl) phthalazinone), and metal salts thereof, etc.; and these compounds are added to a coating solution as a solution, a powder, or a solid fine particle dispersion.

In the recording material having such an image-forming layer, the image-forming layer and/or other layers may contain, if necessary, a sensitizing dye in an amount of preferably from about $10^{-6}$ to about 1 mol per mol of the silver halide in the image-forming layer.

Any sensitizing dyes can be used so long as they can spectrally sensitize silver halide grains in desired wavelength region when adsorbed onto silver halide grains, e.g., examples of the sensitizing dyes include a cyanine dye, a merocyanine dye, a complex cyanine dye, a complex merocyanine dye, a holopolar cyanine dye, a styryl dye, a hemicyanine dye, an oxonol dye and a hemioxonol dye. That is, a sensitizing dye having spectral sensitivity suitable for spectral characteristics of recording light L can be selected.

Addition of sensitizing dyes to a silver halide emulsion is effected by directly dispersing them to an emulsion or may be added to an emulsion by dissolving them in a single solution or a mixed solution of water, methanol, ethanol, N,N-dimethylformamide, etc.

The image-forming layer and/or other layers of this recording material may contain an antifoggant, a stabilizer, a stabilizer precursor, etc., for the purpose of preventing generation of additional fog or reduction of sensitivity during storage.

Examples of antifoggants, stabilizers, stabilizer precursors include thiazonium salts disclosed in U.S. Pat. No.

2,131,038, azaindenes disclosed in U.S. Pat. No. 2,886,437, mercury salts disclosed in U.S. Pat. No. 2,728,663, and urazols disclosed in U.S. Pat. No. 3,287,135. Also as an antifoggant, organic halides disclosed in JP-A-50-119624 and JP-A-8-15809 can be preferably used.

An antifoggant may be added to a coating solution as a solution, a powder, or a solid fine particle dispersion.

The image-forming layer and/or other layers of this recording material may contain benzoic acids for the purpose of increasing sensitivity or preventing fog.

Various kinds of benzoic acid derivatives can be used as benzoic acids and preferred examples thereof include compounds disclosed in U.S. Pat. 4,787,939 and Japanese Patent Application No. 8-151242. These compounds are added to a coating solution as a powder, a solution, or a fine particle dispersion.

The addition amount of benzoic acids is not particularly limited but the amount of from about 1 $\mu$mol to about 2 mol per mol of the silver is preferred.

The image-forming layer and/or other layers of this recording material may contain mercapto compounds, disulfide compounds and thione compounds for the purpose of inhibiting or accelerating development, improving spectral sensitization efficiency, improving storage stability before and after development.

Mercapto compounds having any structure can be used but those represented by the formula Ar-SM or Ar-S-S-Ar (wherein M represents a hydrogen atom or an alkali metal atom; Ar represents an aromatic ring or a condensed aromatic ring containing 1 or more of nitrogen, sulfur, oxygen, selenium or tellurium) are preferably used. Specific examples thereof include 2-mercaptobenzimidazole, 2-mercapto-benzoxazole, 2-mercaptobenzothiazole, 2-mercapto-5-methyl-benzimidazole, 6-ethoxy-2-mercaptobenzothiazole, 4,5-diphenyl-2-imidazolethiol, and 2-mercaptoimidazole.

The addition amount of mercapto compounds is preferably from about 0.001 to about 1.0 mol per mol of the silver.

The image-forming layer and/or other layers of this recording material may contain various dyes and pigments for the purpose of color tone improvement and irradiation prevention.

Any dye and pigment can-be used in the present invention, for example, dyes and pigments described in color index, specifically organic and inorganic pigments, such as a pyrazoloazole dye, an anthraquinone dye, an azo dye, an azomethine dye, an oxonol dye, a carbocyanine dye, a styryl dye, a triphenylmethane dye, an indoaniline dye, an indophenol dye, a phthalocyanine dye can be exemplified. They are added to a coating solution in the form of a solution, an emulsion, or a solid fine particle dispersion, or they are mordanted by a high polymer mordant and added to a coating solution.

The amount of these compounds to be used is determined according to the objective absorption amount, but is generally from about 1 $\mu$g to about 1 g per liter of the coating solution.

Further, the image-forming layer and/or other layers of this recording material may contain, in addition to the above compounds, a plasticizer and a lubricant (e.g., glycerines and diols disclosed in U.S. Pat. No. 2,960,404), a super-high contrasting agent (e.g., hydrazine derivatives disclosed in Japanese Patent Application No. 8-148116), a high contrast accelerator (e.g., onium salts disclosed in Japanese Patent Application No. 8-132836), and a hardening agent (e.g., polyisocyanates disclosed in JP-A-6-208193).

This recording material may contain various layers in addition to the image-forming layer.

For example, a surface protective layer can be provided for protecting the image-forming layer and preventing adhesion. The surface protective layer is formed of adhesion-preventing materials. For example, a wax, silica grains, a styrene-containing elastomeric block copolymer (e.g., styrene/butadiene/styrene), cellulose acetate, cellulose acetate butyrate, cellulose propionate, etc., can be used.

Moreover, an antihalation layer may be provided.

An antihalation layer preferably has a maximum absorption of from 0.3 to 2 in a desired wavelength region and an absorption of from 0.001 to 0.5 in the visible region after processing.

When halation preventing dyes are used, any compound can be used as such a halation preventing dye so long as the dye has objective absorption in a desired wavelength region, an absorption in the visible region after processing is sufficiently little, and preferred spectral shape of absorbance of the antihalation layer can be obtained. For example, the following dyes are exemplified but the present invention is not limited thereto. As a single dye, compounds disclosed in JP-A-7-11432 and JP-A-7-13295, and as a dye which is decolored by processing, compounds disclosed in JP-A-52-139136 and JP-A-7-199409 can be exemplified.

This recording material preferably has an image-forming layer on one side and a backing layer (a back coating layer) on the other side.

A matting agent may be added to a backing layer for improving conveyance property. A matting agent is, in general, fine particles of a water-insoluble organic or inorganic compound. As such an organic compound, preferred examples of vinyl polymers dispersible in water include polymethyl acrylate, methyl cellulose, carboxyl starch, and carboxynitrophenyl starch, and preferred examples of inorganic compounds include silicon dioxide, titanium dioxide, magnesium dioxide, aluminum oxide, and barium sulfate.

The size and shape of the matting agent are not particularly restricted but those having a particle size of from 0.1 to 30 $\mu$m are preferably used. Further, as matting degree of a backing layer, Bekk smoothness (degree) of from 250 to 10 sec. is preferred.

As binders for forming a backing layer, colorless, transparent or translucent various resins can be used, e.g., gelatin, gum arabic, polyvinyl alcohol, hydroxyethyl cellulose, cellulose acetate, cellulose acetate butyrate, casein, starch, poly(meth)acrylic acid, polymethyl methacrylic acid, polyvinyl chloride, etc.

Further, a backing layer preferably has a maximum absorption of from 0.3 to 2 in a desired wavelength region and halation preventing dyes which are used in the foregoing antihalation layer may be added in the backing layer.

A backside resistive heating layer as disclosed in U.S. Pat. Nos. 4,460,681 and 4,374,921 may be provided on the same side on which a backing layer is provided.

In addition to the above layers, this recording material may have an antistatic or electrically conductive layer containing soluble salts (e.g., chloride, nitrate), a deposited metal layer, a layer containing ionic polymers as disclosed in U.S. Pat. No. 2,861,056, and a layer containing insoluble inorganic salts as disclosed in U.S. Pat. No. 3,428,451.

As another example of the recording material for use in the apparatus according to the present invention, the following light-sensitive heat-sensitive recording material can be exemplified. This light-sensitive heat-sensitive recording material (hereinafter referred to as "second recording material") is a recording material comprising a support having provided thereon a light-sensitive heat-sensitive recording layer, wherein the light-sensitive heat-sensitive recording layer contains an encapsulated electron donating colorless dye in a heat-responsible microcapsule, and outside the heat-responsible microcapsule, a compound having an electron accepting part and a polymerizable vinyl monomer part in the same molecule, and a photopolynerization initiator.

As still further example of the recording material for use in the apparatus according to the present invention, the following recording material can be exemplified (hereinafter referred to as "third recording material"), which comprises a support having provided thereon a light-sensitive heat-sensitive recording layer, wherein the light-sensitive heat-sensitive recording layer contains an electron donating colorless dye encapsulated in a heat-responsible microcapsule, and outside the heat-responsible microcapsule, an electron accepting compound, a polymerizable vinyl monomer, and a photopolymerization initiator.

When these recording materials are exposed, composition outside the heat-responsible microcapsule (hereinafter referred to as "photo-curable composition") is set and fixed, and the compound having an electron accepting part and a polymerizable vinyl monomer part or the electron accepting compound becomes movable by heating (not fixed) and migrates in the light-sensitive heat-sensitive recording layer to cause color development (color formation) of the microencapsulated electron donating colorless dye, thereby an image is formed.

The compound having an electron accepting part and a polymerizable vinyl monomer part in the same molecule for use in the photo-curable composition of the second recording material is a composition containing an electron acceptable group and a vinyl group in one molecule.

Specific examples thereof which can be preferably used in the present invention include styrenesulfonylaminosalicylic acid, vinylbenzyloxyphthalic acid, zinc β-(meth)-acryloxyethoxysalicylate, vinyloxyethyloxybenzoic acid, β-(meth)acryloxyethylorsellinate, β-(meth)acryloxyethoxyphenol, β-(meth)acryloxyethyl-β-resorcinate, hydroxystyrenesulfonic acid-N-ethylamide, β-(meth)acryloxypropyl-p-hydroxybenzoate, (meth)acryloxymethylphenol, (meth)acrylamidopropanesulfonic acid, β-(meth)acryloxyethoxy-dihydroxybenzene, γ-styrene-sulfonyloxy-β-(meth)acryloxypropanecarboxylic acid, γ-(meth)-acryloxypropyl-α-hydroxyethyloxysalicylic acid, β-hydroxy-ethoxycarbonylphenol, 3,5-distyrenesulfonic acid amidophenol, (meth)acryloxyethoxyphthalic acid, (meth)acrylic acid, (meth)acryloxyethoxyhydroxynaphthoic acid, β-(meth)acryloxyethyl-p-hydroxybenzoate, β'-(meth)acryloxyethyl-β-resorcinate, β-(meth)acryloxyethyloxycarbonylhydroxybenzoic acid, and metal salts of these compounds (e.g., zinc salt).

These compounds can also be used preferably as a polymerizable vinyl monomer of the photo-curable composition in the third recording material.

As the polymerizable vinyl monomers for use in the third recording material, various monomers having at least one vinyl group in the molecule are usable, for example, (meth)acrylic acid and the salt thereof, (meth)acrylates, (meth)acrylamides; maleic anhydride, maleates; itaconic acid, itaconates; styrenes; vinyl ether and esters; N-vinyl heterocyclic rings; and allyl ether and esters can be used. In particular, monomers having a plurality of vinyl groups in the molecule are preferably used, e.g., (meth)acrylates of polyhydric alcohols, polyhydric phenols, (meth)acrylates of bisphenols, (meth)acrylate-terminated epoxy resins, and (meth)acrylate-terminated polyesters. Specific examples thereof include ethylene glycol diacrylate, ethylene glycol dimethacrylate, trimethylolpropane triacrylate, pentaerythritol tetraacrylate, dipentaerythritol hydroxypentaacrylate, hexanediol-1,5-dimethacrylate, and diethylene glycol dimethacrylate.

These monomers preferably have a molecular weight of about 100 to about 5,000.

Photopolymerization initiators which are used in the second and third recording materials (hereinafter referred to as "recording materials" together) are compounds capable of initiating photopolymerization of the above-described vinyl monomer, and when used in combination with green-, red- to infrared-absorbing dyes, they preferably have sensitivity in these wavelength regions. Organic borate compounds which are said to generate radicals by irradiation (refer to JP-A-62-143044), preferably organic borates of cationic dyes, can be exemplified as examples.

Organic borate generates radicals corresponding to a laser beam irradiated and the radicals initiate polymerization of the above-described vinyl monomer part.

Organic borate represented by formula (1) is used as a photopolymerization initiator:

(1)

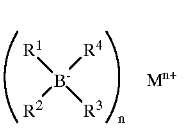

wherein M represents an alkali metal atom, quaternary ammonium, pyridinium, quinolinium, diazonium, morpholinium, tetrazolium, acridinium, phosphonium, sulfonium, oxosulfonium, sulfur, oxygen, carbon, halogenium, or a cation selected from Cu, Ag, Hg, Pd, Fe, Co, Sn, Mo, Cr, Ni, As, and Se; n represents an integer of from 1 to 6; $R^1$, $R^2$, $R^3$ and $R^4$ each represents a halogen atom, a substituted or unsubstituted alkyl group, a substituted or unsubstituted alkenyl group, a substituted or unsubstituted alkynyl group, an alicyclic group, a substituted or unsubstituted aryl group, a substituted or unsubstituted alkaryl group, a substituted or unsubstituted aryloxy group, a substituted or unsubstituted aralkyl group, a substituted or unsubstituted heterocyclic group, or a substituted or unsubstituted silyl group; $R^1$, $R^2$ $R^3$ and $R^4$ may be the same or different, and two or more of them may be bonded to form a ring.

In the above formula (1), examples of borate anions include tetraethyl borate, triisobutylmethyl borate, di-n-butyl-di-t-butyl borate, tetraphenyl borate, tetra-p-chlorophenyl borate, tri-m-chlorophenyl-n-hexyl borate, triphenylethyl borate, trimethylbutyl borate, tritolylisopropyl borate, triphenylbenzyl borate, tetraphenyl borate, tetrabenzyl borate, triphenylphenethyl borate, triphenyl-p-chlorobenzyl borate, triphenylethenyl butyl borate, di(α-nephthyl)dipropyl borate, triphenylsilyltriphenyl borate, tritoluylsilylphenyl borate, and tri-n-butyl (dimethylphenylsilyl) borate.

Examples of organic borates represented by formula (1) are shown below.

(1)

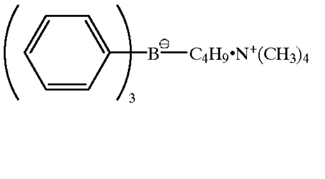

-continued (2)

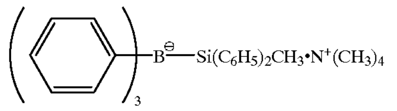

(3)

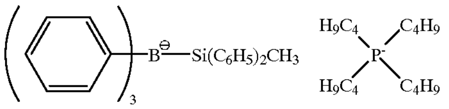

(4)

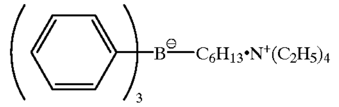

(5)

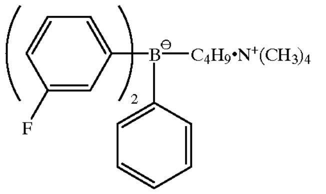

(6)

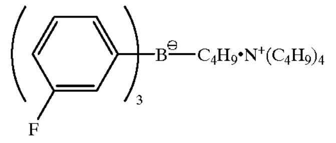

(7)

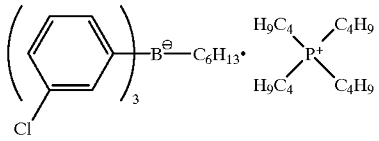

(8)

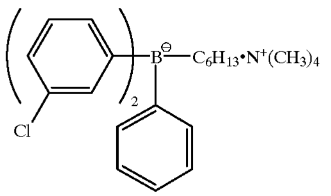

For increasing light absorption efficiency of recording light L, it is preferred to use the organic borate represented by formula (1) in combination with green-, red- to infrared-absorbing dyes as spectral sensitizing dyes.

In particular, organic cationic dyes having maximum absorption wavelength in the wavelength region of from 500 to 1,100 nm are preferably used, specifically a cationic methine dye, a cationic carbonium dye, a cationic quinoneimine dye, a cationic indoline dye, and a cationic styryl dye can be exemplified. More specific examples include, as cationic methine dyes, preferably a polymethine dye, a cyanine dye, and an azomethine dye (more preferably cyanine, carbocyanine, dicarbocyanine, tricarbocyanine, and hemicyanine); as cationic carbonium dyes, preferably a triarylmethane dye, a xanthene dye, and an acridine dye (more preferably rhodamine); as cationic quinoneimine dyes, preferably an azine dye, an oxazine dye, a thiazine dye, a quinoline dye, and a thiazole dye; and these dyes may be used alone or in combination of two or more.

Organic borate of a cationic dye represented by formula (2) is more preferably used as a photopolymerization initiator:

(2)

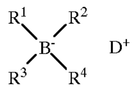

wherein D+ represents a cationic dye; $R^1$, $R^2$, $R^3$ and $R^4$ each represents a halogen atom, a substituted or unsubstituted alkyl group, a substituted or unsubstituted aryl group, a substituted or unsubstituted aralkyl group, a substituted or unsubstituted alkaryl group, a substituted or unsubstituted alkenyl group, a substituted or unsubstituted alkynyl group, a substituted or unsubstituted aryloxy group, a substituted or unsubstituted alicyclic group, a substituted or unsubstituted heterocyclic group, a substituted or unsubstituted allyl group, or a substituted or unsubstituted silyl group; $R^1$, $R^2$, $R^3$ and $R^4$ may be the same or different, and two or more of them may be bonded to form a ring.

In formula (2), a cationic dye represented by D+ functions as a spectral sensitizing dye, and those having absorption peak in the wavelength region of 500 nm or more, in particular, from 550 to 1,100 nm, are preferably used.

Specifically, a cationic methine dye, a cationic carbonium dye, a cationic quinoneimine dye, a cationic indoline dye, and a cationic styryl dye can be exemplified. More specific examples include, as cationic methine dyes, preferably a polymethine dye, a cyanine dye, and an azomethine dye (more preferably cyanine, carbocyanine, dicarbocyanine, tricarbocyanine, and hemicyanine); as cationic carbonium dyes, preferably a triarylmethane dye, a xanthene dye, and an acridine dye (more preferably rhodamine); as cationic quinoneimine dyes, preferably an azine dye, an oxazine dye, a thiazine dye, a quinoline dye, and a thiazole dye.

As borate anions, those exemplified as to formula (1) can be exemplified as preferred examples.

Examples of organic borates of the cationic dye represented by formula (2) are shown below.

(1)

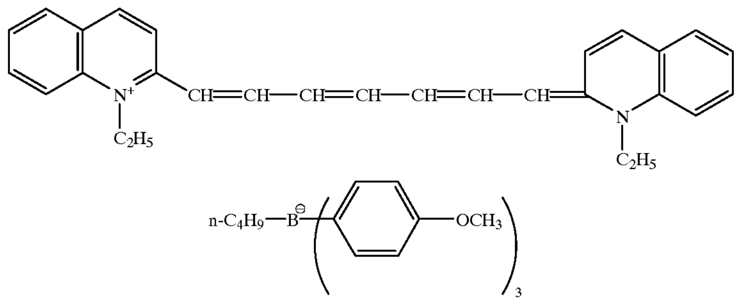

-continued
(2)
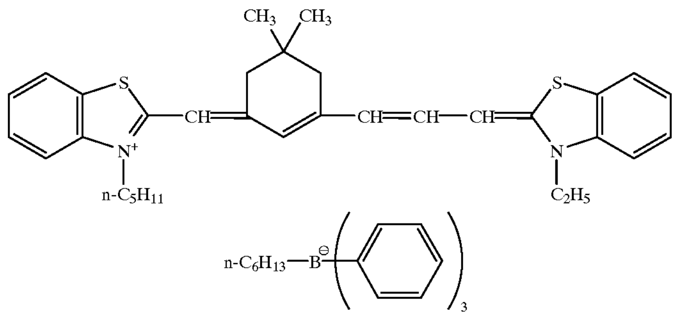
(3)
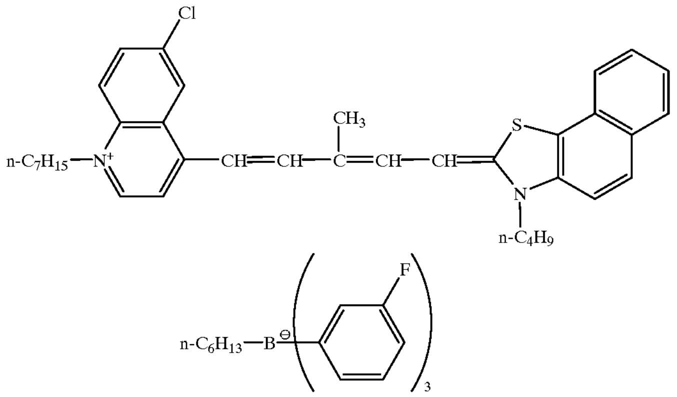
(4)
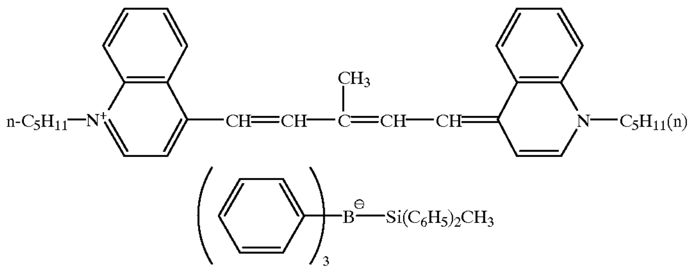
(5)
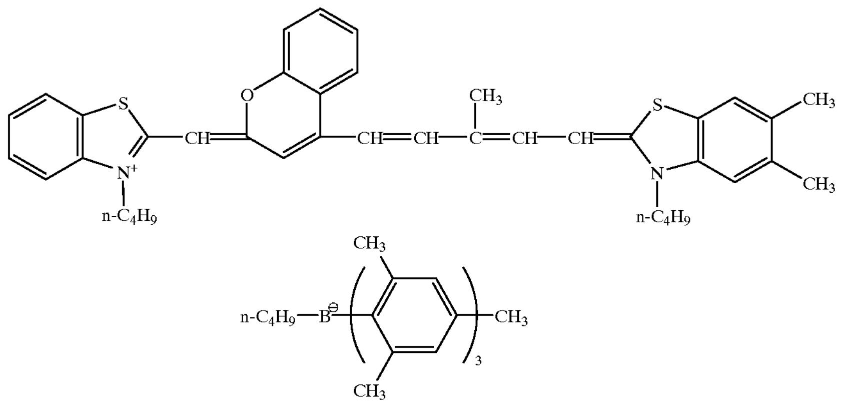

-continued (6)

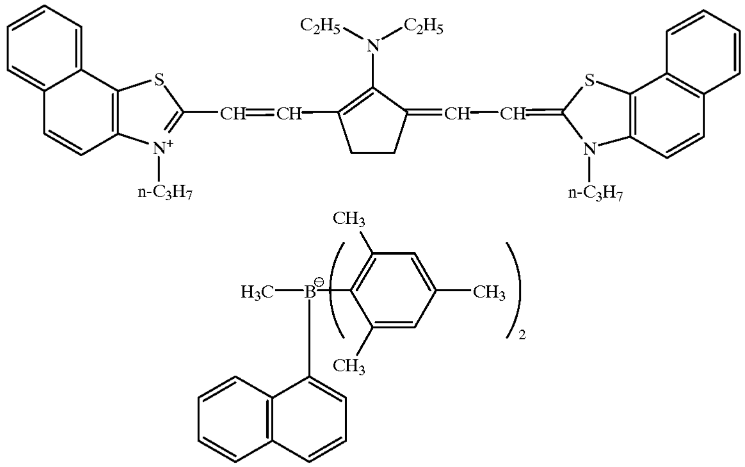

The addition amount of the photopolymerization initiator is preferably from 0.01 to 20 wt % based on the entire weight of the photo-curable composition (other than the heat-responsible microcapsule).

In these recording materials, in addition to the above-described photopolymerization initiator and spectral sensitizing dye, the compound having an active halogen group in the molecule represented by formula (3) or (4) can be used as an auxiliary:

(3)

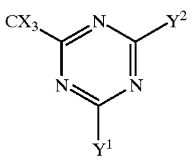

wherein X represents a halogen atom; $Y^1$ represents —$CX_3$, —$NH_2$, —NHR, —$NR_2$, or —OR; R represents an alkyl group, a substituted alkyl group, an aryl group, or a substituted aryl group; and $y^2$ represents —$CX_3$, an alkyl group, a substituted alkyl group, an aryl group, a substituted aryl group, or a substituted alkenyl group; formula (3) itself may be a substituent.

(4)

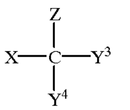

wherein X represents a halogen atom; $y^3$ and $Y^4$, which may be the same or different, each represents a hydrogen atom or a halogen atom; and Z represents the following group:

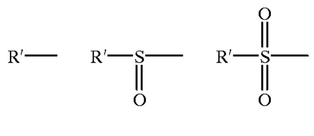

or

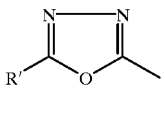

wherein R' represents a hydrogen atom, a halogen atom, an alkyl group, a substituted alkyl group, an aryl group, a substituted aryl group, a substituted alkenyl group, a heterocyclic group, or a substituted heterocyclic group.

A compound represented by formula (3) in which represents $CX^3$ is preferably used.

Specific examples of the compounds represented by formula (3) include 2-phenyl-4,6-bis(trichloromethyl)-S-triazine, 2-(p-chlorophenyl)-4,6-bis(trichloromethyl)-S-triazine, 2-(p-methoxyphenyl)-4,6-bis(trichloromethyl)-S-triazine, 2,4,6-tris(trichloromethyl)-S-triazine, 2-(p-cyanophenyl)-4,6-bis(trichloromethyl)-S-triazine, and 2-(p-acetylphenyl)-4,6-bis(trichloromethyl)-S-triazine.

Examples of the compounds represented by formula (4) include carbon tetrachloride, carbon tetrabromide, iodoform, p-nitro-α,α,α-tribromoacetophenone, ω,ω,ω-tribromoquinaldine, tribromomethylphenylsulfone and trichloromethylphenylsulfone.

The compound represented by formula (3) or (4) is preferably added in an amount of from 0.01 to 20 mol per mol of the spectral sensitizing dye (the cationic dye).

These recording materials are highly sensitive and infrared light-sensitive, but may contain a reducing agent (e.g., an oxygen scavenger), a chain transferring agent of an active hydrogen donor and other compounds in combination as an auxiliary for accelerating latent image formation.

As the oxygen scavenger, which has been found to be useful as the auxiliary for accelerating latent image formation, phosphine, phosphonate, phosphite, stannous salt, and other compounds easily oxidized by oxygen (e.g., N-phenylglycine, trimethylbarbituric acid, N,N-dimethyl-2,6-diisopropylaniline, etc.) can be exemplified.

An electron accepting compound is added to the photo-curable composition of the third recording material. An electron accepting compound may also be added to the photo-curable composition of the second recording material, if necessary, by which color density can be improved.

Examples of electron accepting compounds include a phenol derivative, a salicylic acid derivative, metal salt of aromatic carboxylic acid, acid clay, bentonite, a novolak resin, a metal-processed novolak resin, and a metal complex. As phenol derivatives, 2,2'-bis(4-hydroxyphenyl)propane, 4-t-butylphenol, 4-phenylphenol, 4-hydroxydiphenoxide, 1,1'-bis-(3-chloro-4-hydroxyphenyl)cyclohexane, and 1,1'-bis(3-chloro-4-hydroxyphenyl)-2-ethylbutane can be exemplified. As salicylic acid derivatives, 4-pentadecylsalicylic acid, 3,5-di(a-methylbenzyl)salicylic acid, 3,5-di(tert-octyl)

salicylic acid, 5-octadecylsalicylic acid, 5-α-(p-α-methylbenzyl-phenyl)ethylsalicylic acid, 3-α-methylbenzyl-5-tert-octyl-salicylic acid, and 5-tetradecylsalicylic acid can be exemplified.

The amount of the electron accepting compound is preferably from 5 to 1,000 wt % based on the weight of the electron donating colorless dye.

In addition to these compounds, as a photo-crosslinkable composition, e.g., polyvinyl cinnamate, polyvinyl cinnamylideneacetate, a photo-curable composition having an α-phenylmaleimido group can be added to the photo-curable composition of the recording materials. These photo-crosslinkable compositions can be used as a photo-curable component.

As well as the above compounds, if necessary, a thermal polymerization inhibitor may be added to the photo-curable composition of the recording materials for purposes of preventing thermal and aging polymerization of the photo-curable composition and improving stability.

Preferred examples of thermal polymerization inhibitors include p-methoxyphenol, hydroquinone, t-butyl-catechol, pyrogallol, 2-hydroxybenzophenone, 4-methoxy-2-hydroxybenzophenone, cuprous chloride, phenothiazine, chloranil, naphthylamine,β-naphthol, 2,6-di-t-butyl-p-cresol, nitrobenzene, dinitrobenzene, piclic acid, and p-toluidine, and a thermal polymerization inhibitor is preferably added in an amount of from about 0.001 to about 5 wt % based on the entire weight of the photo-curable composition.

The photo-curable composition is emulsification dispersed and added to the light-sensitive heat-sensitive recording layer.

Examples of solvents for emulsification dispersing the photo-curable composition include cotton seed oil, kerosine, aliphatic ketone, aliphatic ester, paraffin, naphthene oil, alkylated biphenyl, chlorinated paraffin, diarylethane (e.g., 1,1'-ditolylethane), alkyl phthalate (e.g., dibutyl phthalate), phosphate (e.g., diphenyl phosphate), citrate (e.g., acetyl tributyl citrate), benzoate (e.g., octyl benzoate), alkylamide (e.g., diethyllauryl-amide), acetate (e.g., ethyl acetate), acrylate (including methacrylate) (e.g., methyl acrylate), alkyl halide (e.g., methylene chloride and carbon tetrachloride), methyl isobutyl ketone, β-ethoxyethyl acetate, and methyl cellosolve acetate. Among these compounds, aliphatic esters and alkyl halides are particularly preferred, and those having the solubility in water of 10 vol % or less is more preferred.

It is preferred to use these solvents at the rate of from 1 to 500 weight parts based on the photopolymerizable compound.

Further, as a water-soluble high polymer molecule which can be used in emulsification dispersion of the photo-curable composition, compounds having the solubility of 5 wt % or more in water of 25° C. are preferred, specifically gelatin, gelatin derivatives, protein (e.g., albumin), cellulose derivatives (e.g., methyl cellulose), sugar derivatives (e.g., starches (including modified starches)), polyvinyl alcohol, a hydrolyzed product of styrene-maleic anhydride copolymer, carboxyl-modified polyvinyl alcohol, polyacryl-amide, a saponified product of vinyl acetate-polyacrylic acid copolymer, and synthetic high polymer molecule (e.g., polystyrene sulfonate), can be exemplified and gelatin and polyvinyl alcohol are particularly preferred.

On the other hand, microencapsulated electron donating colorless dyes added to the light-sensitive heat-sensitive recording layer of the recording material according to the present invention can be produced using various well-known compounds (e.g., triphenylmethane phthalide compounds, fluoran compounds, phenothiazine compounds, indolyl phthalide compounds, leuco auramine compounds, rhodamine lactam compounds, triphenylmethane compounds, triazene compounds, spiro-pyran compounds, or fluorene compounds).

Specifically, as triphenylmethane phthalide compounds, 3,3-bis(p-dimethylaminophenyl)-6-dimethylamino phthalide and 3-(p-dimethylaminophenyl)-3-(2-methylindol-3-yl) phthalide; as leuco auramine compounds, N-halophenyl-leuco auramine and N-2,4,5-trichlorophenyl leuco auramine; as rhodamine lactam compounds, rhodamine-B-anilinolactam and rhodamine-(p-nitrino)lactam; as fluoran compounds, 2-(dibenzylamino)fluoran, 2-anilino-3-methyl-6-diethylamino-fluoran, and 2-anilino-3-methyl-6-N-methyl-N-cyclohexylamino-fluoran; as phenothiazine compounds, benzyl leuco methylene blue and p-nitrobenzyl leuco methylene blue; as spiro-pyran compounds, 3-methyl-spiro-dinaphthopyran and 3,3'-dichloro-spiro-dinaphthopyran can be exemplified.

When these recording materials are used as a full color recording material, with respect to electron donating colorless dyes for cyan, magenta and yellow, U.S. Pat. No. 4,900,149, as to a yellow coloring type, U.S. Pat. No. 4,800,148, and as to a cyan coloring type, JP-A-63-53542 can be referred to, respectively.

Microencapsulation of these electron donating colorless dyes can be carried out according to well-known techniques in the industry.

For example, the method of using coacervation of hydrophilic wall-forming materials as disclosed in U.S. Pat. No. 2,800,457, the method of interfacial polymerization as disclosed in JP-B-42-771 (the term "JP-B" as used herein means an "examined Japanese patent publication"), the method according to polymer precipitation as disclosed in U.S. Pat. No. 3,660,304, the method using isocyanate polyol wall-forming materials as disclosed in U.S. Pat. No. 3,796,669, the method using isocyanate wall-forming materials as disclosed in U.S. Pat. No. 3,914,511, and the method using urea-formaldehyde-resorcinol wall-forming materials as disclosed in U.S. Pat. No. 4,089,802 are exemplified. In particular, emulsifying the core material, then forming a high polymer film as a microcapsule wall is preferred.

Above all, a microcapsulation method of polymerization by the reactant from the inside of oil droplets is preferred in view of capable of obtaining a recording material containing microcapsules having a uniform particle size and being excellent in storage stability within a short period of time.

For example, when polyurethane is used as a capsule wall material, polyvalent isocyanate and the second material (e.g., polyol, polyamine) which reacts with the polyvalent isocyanate to form a capsule wall are mixed in an oily solution to be capsulated and emulsification dispersed in water, then the reaction temperature is increased, thereby a high polymer-forming reaction occurs at the interface of oil droplets, thus, a microcapsule wall is formed. At this time an auxiliary solvent of low boiling point having high solubility can be used in the oily solution.

As polyvalent isocyanates for use in this case, various polyvalent isocyanates for use in manufacture of well-known urethane resins can be used, such as m-phenylene-diisocyanate, 2,6-tolylenediisocyanate, 2,4-tolylene-diisocyanate, diphenylmethane-4,4-diisocyanate, xylylene-1,4-diisocyanate, 4,4'-diphenylpropanediisocyanate, trimethylenediisocyanate, hexamethylenediisocyanate, etc. Polyvalent isocyanates can also produce high polymer compound by reacting with water.

Various polyols for use in manufacturing well-known urethane resins can be used in the present invention, such as aliphatic and aromatic polyhydric alcohols, hydroxy polyester, hydroxypolyalkylene ether, etc. Examples thereof include ethylene glycol, 1,3-propanediol, 1,4-butanediol, 1,5-pentanediol, 1,6-hexanediol, propylene glycol, 2,3-dihydroxybutane, 1,2-dihydroxybutane, 2,5-hexanediol, 3-methyl-1,5-pentanediol, dihydroxycyclohexane, etc. Polyols are preferably used in the rate of the hydroxyl group of from about 0.02 to about 2 mol per mol of isocyanate.

Examples of polyamines for use in the present invention include ethylenediamine, trimethylenediamine, tetramethylenediamine, pentamethylenediamine, hexamethylenediamine, p-(m-)phenylenediamine, piperazine and derivatives thereof, 2-hydroxytrimethylenediamine, diethylenetriamine, triethylenetriamine, triethylenetetramine, tetraethylenepentamine, amine adducts of epoxy compounds, etc.

Microcapsules can also be produced using water-soluble high polymer compounds and in this case the water-soluble high polymer compounds may be any of a water-soluble anionic high polymer compound, nonionic high polymer compound, and ampholytic high polymer compound.

Examples of anionic high polymer compounds include those having a —COO— group, an —$SO_2$— group, etc., such as gum arabic, alginic acid, sulfated starch, sulfated cellulose, gelatin derivative of phthalated gelatin, acrylic acid (methacrylic acid) (co)polymers, vinylbenzenesulfonic acid (co)polymers, carboxyl-modified polyvinyl alcohol, etc.

Examples of nonionic high polymer compounds include polyvinyl alcohol, hydroxyethyl cellulose, methyl cellulose, etc.

Examples of ampholytic high polymer compounds include gelatin, etc. Among these, gelatin, gelatin derivatives and polyvinyl alcohol are particularly preferred.

Water-soluble high polymer compounds are used as an aqueous solution of from 0.01 to 10 wt %.

In the recording materials of the present invention, the average particle size of capsules is 20 $\mu$m or less, and 5 $\mu$m or less is particularly preferred in view of resolution. If capsules are too small, the surface area per a certain solid content becomes large and a large quantity of a capsule material is necessary, therefore, the average particle size of capsules is preferably 0.1 $\mu$m or less.

An electron donating colorless dye may be present as a solution in a microcapsule or may be present in the solid state.

When an electron donating colorless dye is encapsulated as a solution, it is preferred to dissolve the dye in a solvent and encapsulate. The amount of the solvent at that time is preferably from 1 to 500 weight parts per 100 weight parts of the electron donating colorless dye. The same solvent as used in the above-described emulsification of the photo-curable composition can be used at the time of microencapsulation. Further, a volatile solvent (e.g., acetate) can be used as the auxiliary solvent for dissolving the electron donating colorless dye in combination with other solvents at microencapsulation.

In addition to the light-sensitive heat-sensitive recording layer, the recording material according to the present invention may have various kinds of layers, e.g., a protective layer, an interlayer, etc., and it is preferred for the protective layer to contain a matting agent.

Examples of matting agents include inorganic particles (e.g., silica, magnesium oxide, barium sulfate, strontium sulfate, etc.), resin particles (e.g., polymethyl methacrylate, polyacrylonitrile, polystyrene, etc.), starch particles (e.g., carboxyl starch, corn starch, etc.). Among these, polymethyl methacrylate particles and silica particles are particularly preferably used. As silica particles, Siloid AL series (manufactured by Fuji-Devison Chemical Ltd.) can be used.

The particle size of the matting agent is preferably from 1 to 20 $\mu$m, and the addition amount is preferably from 2 to 500 mg/$m^2$.

It is preferred to use a curing agent in each of the light-sensitive heat-sensitive recording layer, the interlayer and the protective layer of the recording material of the present invention. In particular, the addition of a curing agent to the protective layer to reduce the adhesion properties of the protective layer is preferred.

Gelatin hardening agent which is used in the production of photographic materials is useful as a curing agent, specifically chrome alum, zirconium sulfate, boric acid, 1,3,5-triacryloyl-hexahydro-s-triazine, 1,2-bis-vinylsulfonylmethane, 1,3-bis(vinylsulfonylmethyl) propanol-2, bis(a-vinylsulfonylacetamido)ethane, 2,4-dichloro-6-hydroxy-s-triazine sodium salt, 2,4,6-triethyleneimino-s-triazine can be exemplified.

The addition amount of the curing agent in each layer is preferably from about 0.5 to about 5 wt % based on the binder.

Colloidal silica may be added to the protective layer to reduce the adhesion properties.

As colloidal silica, for example, Snowtex 20, Snowtex 30, Snowtex C, Snowtex O, Snowtex N (manufactured by Nissan Chemical Industries Ltd.) can be used, and the addition amount of from about 5 to about 80 wt % based on the binder is preferred.

Moreover, a fluorescent whitening agent and a blue dye as a bluing agent may be added to the protective layer to increase the whiteness degree of the recording layer.

When the recording material is used as a multicolor recording material, a multilayer constitution can be employed such that each layer contains microcapsules containing electron donating colorless dyes developing in different hues and photo-curable compositions sensitive to light of different wavelengths, and an interlayer containing a filter dye may be provided between light-sensitive and heat-sensitive layers.

The interlayer primarily comprises a binder and a filter dye and contains, if necessary, additives (e.g., a curing agent and a polymer latex).

Filter dyes for use in the recording material of the present invention can be added to desirable layers, in particular, the interlayer, by the oil-in-water dispersing method or the polymer dispersing method. In the oil-in-water dispersing method, filter dyes are dissolved in a single solution or a mixed solution of a high boiling point organic solvent having a boiling point of, e.g., 175° C. or more, and an auxiliary solvent having a boiling point of, e.g., from 30 to 160° C., and then finely dispersed in an aqueous medium such as water, an aqueous gelatin solution or an aqueous solution of polyvinyl alcohol in the presence of a surfactant.

The process of the latex dispersing method and specific examples of curing and impregnation latices are disclosed in U.S. Pat. No. 4,199,383. As proper latices, e.g., copolymer latices of acrylate (methacrylate) such as ethyl acrylate and acid monomers such as acrylic acid are preferred.

In the recording material of the present invention, as binders of each layer of the protective layer, the light-sensitive heat-sensitive layer, the interlayer, etc., besides water-soluble high polymer compounds capable of being used for emulsification dispersion of photo-curable compositions and capsulation of electron donating colorless dyes, polystyrene, polyvinyl formal, polyvinyl butyral, polyvinyl alcohol, an acrylic resin (e.g., polymethyl acrylate), solvent-soluble high polymer compounds (e.g., a phenolic resin, ethyl cellulose, an epoxy resin, a urethane resin), or high polymer latices thereof, can be used. Of these, gelatin and polyvinyl alcohol are preferably used.

Each layer of the recording material may contain various kinds of surfactants for various purposes, e.g., as a coating aid, an antistatic agent, for improving sliding properties, emulsification dispersion, adhesion prevention, and the like.

As surfactants, various nonionic surfactants (e.g., saponin, polyethylene oxide and derivatives thereof); various anionic surfactants (e.g., alkylsulfonate, alkylsulfate, N-acyl-N-alkyltaurines, and sulfosuccinate); ampholytic surfactants (e.g., alkylbetaines, and alkylsulfobetaines); and cationic surfactants (e.g., aliphatic or aromatic quaternary ammonium salts), can be used according to necessity.

Further, besides the above-described additives, if necessary, dyes capable of preventing irradiation and halation, an ultraviolet absorber, a plasticizer, a fluorescent whitening agent, a coating aid, a curing agent, an antistatic agent, and a sliding property improver may be added.

These characteristic recording material having an image-forming layer or recording material having a light-sensitive heat-sensitive recording layer can be produced by preparing a coating solution (an emulsion) containing components of each layer using a solvent, if necessary, coating by well-known means and drying.

Various solvents which are used in the production of recording materials can be used, such as water, alcohols (e.g., ethanol and isopropanol), halogen-based solvents (e.g., ethylene chloride), ketones (e.g., cyclohexanone and methyl ethyl ketone), esters (e.g., methyl cellosolve acetate and ethyl acetate), toluene, xylene, etc., and if necessary, these solvents may be used as a mixture of two or more. Moreover, various surfactants such as nonionic, anionic, cationic and fluorine-based surfactants can be added to the coating solution for improving coating properties and antistatic properties.

Various well-known coating means such as a blade coater, a rod coater, a knife coater, a roll doctor coater, a reverse roll coater, a transfer roll coater, a gravure coater, a kiss coater, and a curtain coater can be used. The coating amount of each coating solution is, of course, adjusted to reach the predetermined dry weight of each layer.

Supports constituting these recording materials are not particularly limited and various supports which are used in general recording materials can be used. Examples of the supports include resin films, such as a polyester film, a polyethylene terephthalate film, a polyethylene naphthalate film, a cellulose nitrate film, a cellulose ester film, a polyvinyl acetal film, and a polycarbonate film; various metals, such as aluminum, zinc and copper; glass and paper.

EXAMPLE

The present invention is described with reference to specific examples but the present invention is not limited thereto without departing from the spirit and scope thereof. Preparation of Organic Silver Dispersion Forty (40) g of behenic acid, 7.3 g of stearic acid, and 500 ml of water were stirred at 90° C. for 15 minutes, and 500 ml of water were stirred at 90° C. for 15 minutes, further 61 ml of 1 N aqueous solution of nitric acid was added thereto and the temperature was lowered to 50° C. Then, 124 ml of a 1 N aqueous solution of silver nitrate was added 124 ml of a 1 N aqueous solution of silver nitrate was added minutes. Thereafter, the solid content was filtered with suction and the solid content filtered was washed with water until the conductance of the filtered water reached 30 μS/cm. until the conductance of the filtered water reached 30 μS/cm. as a wet cake. Ten (10) g of polyvinyl alcohol (trade name: PVA-205) and water were added to the wet cake corresponding to 100 g of dry solid content to make the entire weight 500 g and pre-dispersed by a homomixer. Subsequently, the pre-dispersed stock solution was treated three times using a disperser (trade name: "Microfluidizer M-110S-EH", manufactured by Microfluidex International Corporation, G10Z interaction chamber was used) with adjusting the pressure of the disperser to 1,750 kg/cm$^2$. Thus, the preperation of organic silver fine particle dispersion having volume addition average diameter of 0.39 μm was terminated. Determination of the grain size was carried out using Master Sizer X manufactured by Malvern Instruments Ltd.

Preparation of Silver Halide Grains

Twenty-two (22) g of phthalated gelatin and 30 mg of adjusted to 5.0 at 40° C., then 159 ml of an aqueous solution containing 18.6 g of silver nitrate and an aqueous solution containing potassium bromide were added thereto by a controlled double jet method over 10 minutes with maintaining the pAg at 7.7. Subsequently, 476 ml of an aqueous solution containing 55.4 g of silver nitrate and an aqueous solution containing 8 μmol/liter of dipotassium hexachloroiridate and 1 mol/liter of potassium bromide were added thereto by a controlled double jet method over 30 minutes with maintaining the pAg at 7.7. Thereafter, the pH value was lowered and desalt treatment was performed by flocculation sedimentation, then 0.1 g of phenoxy ethanol was added to adjust the pH and pAg to 5.9 and 8.0, respectively. The thus-obtained grains were cubic grains having the average grain size of 0.07 μm, the variation coefficient of the projected area diameter of 8%, and {100} face ratio of 86%.

The temperature of the above-prepared silver halide grains was increased to 60° C., and then 85 μmol of sodium thiosulfate, 11 μmol of 2,3,4,5,6-pentafluorophenyldiphenyl-phosphine selenide, 2 μmol of the following tellurium compound 1, 3.3 μmol of chloroauric acid, and 230 μmol of thiocyanic acid, each per mol of silver, were added and the reaction system was ripened for 120 minutes.

Subsequently, the temperature was lowered to 40° C., and $3.5\times10^{-4}$ mol of the following sensitizing dye A was added to the silver halide while stirring, after 5 minutes, $4.6\times10^{-3}$ mol of the following compound A was added to the silver halide, stirred for 5 minutes, then quenched to 25° C., thus silver halide grains were prepared.

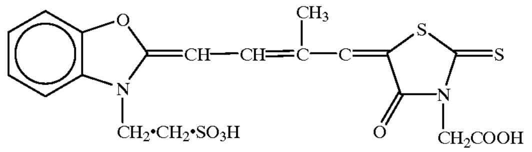

Sensitizing Dye A

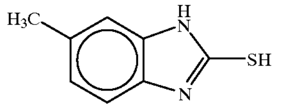

Compound A

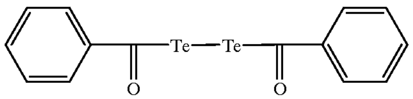

Tellurium Compound 1

Preparation of Solid Fine Particle Dispersion Solution Stocks

Solid fine particle dispersions of tetrachlorophthalic acid, 1,1-bis(2-hydroxy-3,5-dimethylphenyl)-3,5,5-trimethylhexane and tribromomethylphenylsulfone were prepared respectively.

To tetrachlorophthalic acid were added 0.81 g of hydroxypropylmethyl cellulose and 94.2 ml of water and the mixture was thoroughly stirred to make slurry. The slurry was allowed to stand for 10 hours. Subsequently, 100 ml of zirconia beads having the average diameter of 0.5 mm and the above obtained slurry were put in a vessel and dispersed in a disperser (a ¼ G Sand Grinder Mill: manufactured by Imex K. K.) for 5 hours, thereby solid fine particle dispersion solution of tetrachlorophthalic acid was obtained. Seventy (70) wt % of the obtained grains had a particle diameter of 1.0 μm or less. With respect to other compounds, respective solid fine particle dispersion solutions were prepared by optionally changing the amount of the dispersant and dispersing time for obtaining the desired average particle diameter.

Preparation of Polymer Fine Particle Dispersion Containing Dye

A solution containing 2 g of the following dye A, 6 g of a methyl methacrylate/methacrylic acid copolymer (85/15), and 40 ml of ethyl acetate was heated to 60° C. and dissolved, and then this solution was added to 100 ml of an aqueous solution containing 5 g of polyvinyl alcohol and finely dispersed using a high rate stirrer (homogenizer, manufactured by Nippon Seiki Seisaku-sho Co., Ltd.) at 12,000 rpm for 5 minutes, thus, polymer fine particle emulsification dispersion P having the average particle diameter of 0.3 μm was obtained.

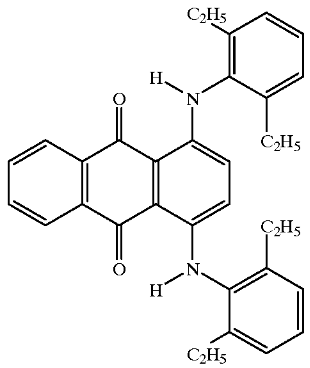

Dye A

Preparation of Emulsion Layer Coatinq Solution

To the above-prepared organic silver fine particle dispersion (an amount corresponding to 1 mol of silver) were added silver halide grains in an amount of 10 mol % (as a silver halide coverage) based on organic silver in the organic silver fine particle dispersion and the following binder and materials for development, thereby emulsion coating solution was obtained.

Binder

LACSTAR 3307B (manufactured by Dainippon Chemicals and Ink Co., Ltd.; SBR latex): 430 g Materials for Development Tetrachlorophthalic acid: 5 g (contained in the above dispersion) 1,1-Bis(2-hyddroxy-3,5-dimethylphenyl)-3,5,5-trimethylhexane: 98 g (contained in the above dispersion)

Phthalazine: 9.2 g

Tribromomethylphenylsulfone:. 12 g (contained in the above dispersion)

4-Methylphthalic acid: 7 g

Dye

Dye A: 4 g (contained in the above polymer fine particle dispersion containing dye)

LACSTAR 3307B used above was a polymer latex of a styrene/butadiene copolymer, and the average particle size of the dispersion was about 0.1 μm to about 0.15 μm.

Preparation of Coating Solution for Protective Layer of Emulsion Surface

Zero point two six (0.26) g of surfactant A, 0.09 g of surfactant B, 0.9 g of silica fine particles (average particle size: 2.5 μm), 0.3 g of 1,2-bis(vinylsulfonyl-acetamido) ethane, and 64 g of water were added to 10 g of inert gelatin to make the coating solution for the protective layer of the emulsion surface.

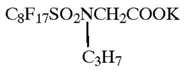

Surfactant A

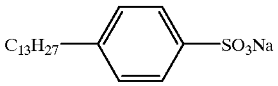

Surfactant B

Preparation of Dye Dispersion

The following dye B in an amount of 0.8 g was added to 35 g of ethyl acetate, stirred and dissolved. To the solution was added 85 g of an aqueous solution containing 6 wt % of pre-dissolved polyvinyl alcohol (PVA-217) and the solution was stirred by a homogenizer for 5 minutes. Then, the ethyl acetate was volatilized by desolvation, diluted with water in the last place, thereby the dye dispersion was prepared.

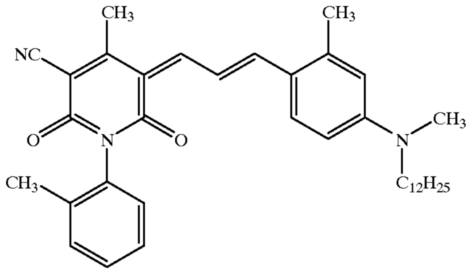

Dye B

Preparation of Solid Base Fine Particle Dispersion

To 26 g of the following solid base, 234 g of an aqueous solution containing 2 g of polyvinyl alcohol (PVA-215) was added and thoroughly stirred to make a slurry. The slurry was allowed to stand for 10 hours. Subsequently, 100 ml of zirconia beads having the average diameter of 0.5 mm and the above slurry were put in a vessel and dispersed in a disperser (a ¼ G Sand Grinder Mill: manufactured by Imex K. K.) for 5 hours, thereby a solution of solid base fine particle dispersion was obtained.

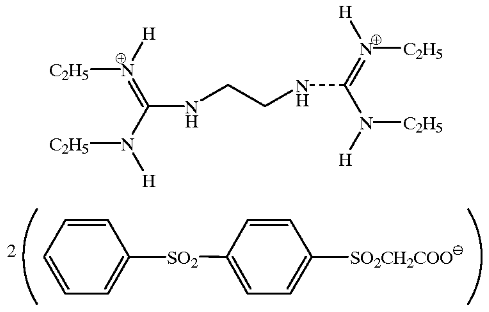

Preparation of Coating Solution for Back Surface

Coating solution for the back surface was prepared by adding 20 g of the above-prepared dye dispersion, 20 g of the above-prepared solid base fine particle dispersion and 35 g of water to 38 g of a 10% aqueous gelatin solution.

Preparation of Coating Solution for Protective Layer of Back Surface

Zero point two six (0.26) g of surfactant A, 0.09 g of surfactant B, 0.3 g of 1,2-bis(vinylsulfonylacetamido)-ethane, 0.4 g of Sildex H121 (really spherical silica, manufactured by Dokai Chemical Co., Ltd., average particle size: 12 μm) and 64 g of water were added to 10 g of inert gelatin to make the coating solution for the protective layer of the back surface.

Preparation of Coated Sample

The above-prepared coating solution for the emulsion layer was coated on a polyethylene terephthalate support having the thickness of 175 μm by adjusting the additives in the light-sensitive layer so as to give a silver coverage of 2.2 $g/m^2$, and then the coating solution for the protective layer of the emulsion surface was coated on the emulsion coated layer so as to give a gelatin coverage of 1.8 $g/m^2$. After drying, the coating solution for the back surface was coated on the side opposite to the side on which the emulsion layer was coated so as to give dye B coverage of 56 $mg/m^2$. Further, the coating solution for the protective layer of the back surface was coated on the back surface coated layer so as to give gelatin coverage of 1.8 $g/m^2$. Thus, the sample was prepared.

When an image was formed on the above-prepared recording material using heat developing apparatus 10 shown in FIG. 21, a high quality image without uneven development was obtained.

EFFECT OF THE INVENTION

As described above, according to the heat processing apparatus of the present invention and the heat developing apparatus using the same, an image of high image quality without uneven development can be formed by realizing more even contact of a heater and a sheet without causing dust adhesion, without generating folds and wrinkles, without making scratches, and without corrosion of electronic parts.

While the intention has been described in detail and with reference to specific examples thereof, it will be apparent to one skilled in the art that various changes and modifications can be made therein without departing from the spirit and scope thereof.

What is claimed is:

1. A heat processing apparatus comprising:

a heater to perform heat processing of a prescribed temperature to a sheet to be heat processed at a fixed position;

a transferring means to convey the sheet to be heat processed by sliding on the surface of the heater; and a pressing means to press at least one part of the sheet to be heat processed against the surface of the heater, during transferring, by partially pressurizing one part of the sheet without pressurizing the whole surface of the sheet;

wherein the pressing means become a transferring means having driving force.

2. The heat processing apparatus as claimed in claim 1, wherein the nonfunctional surface of said sheet to be heat processed is in contact with the surface of said heater.

3. The heat processing apparatus as claimed in claim 1, wherein the non-observing surface of said sheet to be heat processed is in contact with the surface of said heater.

4. The heat processing apparatus as claimed in claim 1, wherein the surface of said heater is covered with a lubricating sheet containing a fluororesin and having a low friction coefficient.

5. The heat processing apparatus as claimed in claim 4, wherein said lubricating sheet comprises a resin material other than fluororesins, having a glass transition temperature higher than the heating temperature having being adhered on the fluororesin material.

6. The heat processing apparatus as claimed in claim 4, wherein said heat processing apparatus is provided with a sheet-stretching means which imparts tensile strength to said lubricating sheet in the vertical direction to the transferring direction of the sheet to be heat processed.

7. The heat processing apparatus as claimed in claim 4, wherein said lubricating sheet can be freely released from the heater.

8. The heat processing apparatus as claimed in claim 4, wherein said lubricating sheet is electrically conductive.

9. The heat processing apparatus as claimed in claim 1, wherein the surface of said heater is provided with a coating layer containing a fluororesin and having a low friction coefficient.

10. The heat processing apparatus as claimed in claim 9, wherein said coating layer has surface hardness HV (0.025) of 300 or more.

11. The heat processing apparatus as claimed in claim 9, wherein said coating layer has surface roughness Ra of 1.0 μm or less.

12. The heat processing apparatus as claimed in claim 9, wherein the surface roughness values of said coating layer and said sheet to be heat processed are in the range not overlapped with each other.

13. The heat processing apparatus as claimed in claim 1, wherein said pressing means comprises a plurality of pressing rollers provided on the surface of the heater.

14. The heat processing apparatus as claimed in claim 13, wherein the rotating accuracy of said pressing rollers is ½ of the thickness of said sheet to be heat processed.

15. The heat processing apparatus as claimed in claim 13, wherein the most upstream pressing roller and the most downstream pressing roller of said pressing rollers are respectively arranged at positions within 5 mm from the extreme ends of the heater.

16. The heat processing apparatus as claimed in claim 13, wherein said transferring means is arranged at least at the upstream position just in front of the pressing rollers and at the downstream position just in the rear of the arrangement extent of the pressing rollers.

17. The heat processing apparatus as claimed in claim 13, wherein said transferring means is a transferring belt which is strained over driving rollers and runs between the heater and the pressing rollers to convey the sheet to be heat processed.

18. The heat processing apparatus as claimed in claim 17, wherein the transferring means is provided with rollers to separate the transferring belt from the sheet to be heat processed between respective contiguous pressing rollers.

19. The heat processing apparatus as claimed in claim 17, wherein said transferring belt which is a transferring means has a friction coefficient with the sheet to be heat processed higher than the friction coefficient of the surface of the heater with the sheet to be heat processed.

20. The heat processing apparatus as claimed in claim with 1, wherein the surfaces of the pressing rollers which function as pressing and transferring means have a friction coefficient with the sheet to be heat processed higher than the friction coefficient of the surface of the heater with the sheet to be heat processed.

21. The heat processing apparatus as claimed in claim 13, wherein each pressing roller comprises spit-shaped rollers having at least one cylindrical cutout in the axial direction.

22. The heat processing apparatus as claimed in claim 13, wherein said heater is a flat plate heater and said plurality of pressing rollers are arranged on the upside of the flat plate heater to press the sheet to be heat processed on the flat plate heater from the upper side.

23. The heat processing apparatus as claimed in claim 22, wherein said flat plate heater has the constitution of prescribed distribution of heat capacity.

24. The heat processing apparatus as claimed in claim 22, wherein the thickness of said flat plate heater corresponds to the prescribed distribution of the heat capacity.

25. The heat processing apparatus as claimed in claim 22, wherein said flat plate heater has the constitution of prescribed distribution of the electric power density.

26. The heat processing apparatus as claimed in claim 22, wherein a plurality of dimples are provided on the surface of said flat plate heater on which the sheet to be heat processed is conveyed.

27. The heat processing apparatus as claimed in claim 13, wherein said heater is a curved plate heater curved in the transferring direction and said plurality of pressing rollers are arranged along by this curved shape.

28. The heat processing apparatus as claimed in claim 27, wherein said curved plate heater has the constitution of prescribed distribution of heat capacity.

29. The heat processing apparatus as claimed in claim 28, wherein the thickness of said curved plate heater corresponds to the prescribed distribution of the heat capacity.

30. The heat processing apparatus as claimed in claim 27, wherein a plurality of dimples are provided on the surface of said curved plate heater on which the sheet to be heat processed is conveyed.

31. The heat processing apparatus as claimed in claim 27, wherein the spaces between rollers of the surface of said curved plate heater on which the sheet to be heat processed is conveyed, which are non-pressure parts of the pressing rollers, are formed flatly.

32. The heat processing apparatus as claimed in claim 27, wherein between rollers which are non-pressure parts of the pressing rollers the surface of said curved plate heater on which the sheet to be heat processed is conveyed is a smooth convexity protruding toward the roller-arranged side.

33. The heat processing apparatus as claimed in claim 27, wherein the inlet of the sheet to be heat processed of said curved plate heater is arranged at the position where the sheet to be heat processed is accepted in a horizontal state.

34. The heat processing apparatus as claimed in claim 1, wherein the pressing means comprises pressing rollers having a driving force.

35. A heat developing apparatus which comprises contacting a heat-developable light-sensitive material or a light-sensitive heat-sensitive recording material in which a latent image has been formed with a heating means at heat developing part to thereby obtain a visible image, wherein said heating means is a plate heater, a plurality of pressing rollers are arranged to face each other along one surface of said plate heater, said heat-developable light-sensitive material or said light-sensitive heat-sensitive recording material is passed between said pressing rollers and said plate heater by a transferring means such that the pressing rollers partially pressurize one part of the material without pressurizing the whole surface of the material and thereby effecting heat development, and further wherein said pressing rollers become a transferring means having driving force.

36. The heat developing apparatus as claimed in claim 35, wherein said transferring means is arranged at least at the upstream position just in front of the pressing rollers and at the downstream position just in the rear of the arrangement extent of said pressing rollers.

37. The heat developing apparatus as claimed in claim 35, wherein the non-image-forming layer of said heat-developable light-sensitive material or said light-sensitive heat-sensitive recording material is in contact with the surface of said plate heater.

38. The heat developing apparatus as claimed in claim 35, wherein said plate heater is a flat plate heater.

39. The heat developing apparatus as claimed in claim 35, wherein said plate heater is a curved plate heater.

40. The heat developing apparatus as claimed in claim 35, wherein the surface of said plate heater is covered with a lubricating sheet containing a fluororesin and having a low friction coefficient.

41. The heat developing apparatus as claimed in claim 35, wherein the surface of said plate heater is provided with a coating layer containing a fluororesin and having a low friction coefficient.

42. The heat developing apparatus as claimed in claim 39, wherein one driving roller is arranged in contact with said plurality of pressing rollers so that an enveloping surface of said plurality of pressing rollers is equal to a circumferential surface of said driving roller and said plurality of pressing rollers are rotated by said driving roller.

43. The heat developing apparatus as claimed in claim 35, wherein said plurality of pressing rollers are arranged with varying the pitch between each roller.

44. The heat developing apparatus as claimed in claim 35, wherein said heat developing apparatus is provided with a gas filter to clean the ambient atmosphere of said plate heater.

* * * * *